US011718918B2

(12) United States Patent
Solomon et al.

(10) Patent No.: US 11,718,918 B2
(45) Date of Patent: Aug. 8, 2023

(54) METHOD FOR INHIBITING METAL CORROSION DURING ACID CLEANING OR PICKLING

(71) Applicant: KING FAHD UNIVERSITY OF PETROLEUM AND MINERALS, Dhahran (SA)

(72) Inventors: Moses M. Solomon, Dhahran (SA); Saviour A. Umoren, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/840,663

(22) Filed: Jun. 15, 2022

(65) Prior Publication Data
US 2022/0316073 A1  Oct. 6, 2022

Related U.S. Application Data

(62) Division of application No. 16/526,021, filed on Jul. 30, 2019, now Pat. No. 11,408,079.

(51) Int. Cl.
| | | |
|---|---|---|
| C09K 8/54 | (2006.01) | |
| C09K 8/08 | (2006.01) | |
| C23F 11/173 | (2006.01) | |
| C08L 5/02 | (2006.01) | |
| C08L 1/28 | (2006.01) | |
| C08L 5/06 | (2006.01) | |
| C08K 3/08 | (2006.01) | |
| C23G 1/06 | (2006.01) | |
| C08L 5/04 | (2006.01) | |

(52) U.S. Cl.
CPC .............. *C23F 11/173* (2013.01); *C08K 3/08* (2013.01); *C08L 1/286* (2013.01); *C08L 5/02* (2013.01); *C08L 5/04* (2013.01); *C08L 5/06* (2013.01); *C23G 1/063* (2013.01); C08K 2003/0806 (2013.01); C08K 2201/003 (2013.01); C08L 2201/08 (2013.01)

(58) Field of Classification Search
CPC ......... C23F 11/00; C23F 11/04; C23F 11/173; C23F 11/18; C08L 1/286; C08L 5/00; C08L 5/02; C08L 5/04; C08L 5/06; C23G 1/00; C23G 1/04; C23G 1/06; C23G 1/08
See application file for complete search history.

(56) References Cited

U.S. PATENT DOCUMENTS

| | | |
|---|---|---|
| 2,962,356 A | 11/1960 | Johns |
| 5,779,938 A | 7/1998 | Naraghi |
| 7,012,051 B2 | 3/2006 | Daviot et al. |

FOREIGN PATENT DOCUMENTS

| | | |
|---|---|---|
| CN | 1023300092 A | 1/2012 |
| CN | 106633524 A | 5/2017 |
| CN | 108976660 A | 12/2018 |
| RU | 2 261 292 C2 | 9/2005 |
| RU | 2 387 740 C1 | 4/2010 |
| WO | 2011/126684 A2 | 10/2011 |

OTHER PUBLICATIONS

Green Synthesis of Silver Nanoparticles Using Extracts of Ananas comosus, Ahmad et al., Green and Sustainable Chemistry, 2012, 2, 141-147.*
Green inhibitors for steel corrosion in acidic environment: state of art, Wei et al., Materials Today Sustainability 10 (2020) 100044.*
Solomon, et al. ; Gum Arabic-silver nanoparticles composite as a green anticorrosive formulation for steel corrosion in strong acid media ; Carbohydrate Polymers 181 ; pp. 43-55 ; 2018 ; 14 Pages.
Umoren, et al. ; Application of carbohydrate polymers as corrosion inhibitors for metal substrates in different media: A review ; Carbohydrate Polymers (2015) ; 75 Pages.
Umoren, et al. ; Performance evaluation of pectin as ecofriendly corrosion inhibitor for X60 pipeline steel in acid medium: Experimental and theoretical approaches ; Carbohydrate Polymers, vol. 124 ; pp. 280-291 ; Jun. 2015 ; Abstract Only ; 2 pages.
Ekanem, et al. ; Inhibition of mild steel corrosion in HCl using pineapple leaves (*Ananas comosus* L.) extract ; Journal of Materials Science, vol. 24, Issue 20 ; pp. 5558-5566 ; Oct. 2010 ; Abstract Only ; 1 Page.
Mobin, et al. ; Pineapple stem extract (Bromelain) as an environmental friendly novel corrosion inhibitor for low carbon steel in 1 M HCl ; Measurement 1 34 ; pp. 595-605 ; Nov. 3, 2018 ; 12 Pages.
Narenkumar, et al ; Bioengineered silver nanoparticles as potent anti-corrosive inhibitor for mild steel in cooling towers ; Environmental Science and Pollution Research ; Nov. 15, 2017 ; 12 Pages.
Essien, et al. ; Synthesis, characterization and anticorrosion property of olive leaves extract-titanium nanoparticles composite ; Journal of Adhesion Science and Technology, vol. 32, Issue 16 ; 2018 ; Abstract Only ; 2 Pages.
Mainier, et al. ; Evaluation of titanium in hydrochloric acid solutions containing corrosion inhibitors ; IOSR Journal of Mechnical and Civil Engineering, vol. 10, Issue 1 ; pp. 66-69 ; Nov.-Dec. 2013 ; 4 Pages.
Deyab ; Corrosion inhibition of heat exchanger tubing material (titanium) in MSF desalination plants in acid cleaning solution using aromatic nitro compounds ; Desalination 439 ; pp. 73-79 ; 2018 ; 7 Pages.

(Continued)

*Primary Examiner* — Haidung D Nguyen
(74) *Attorney, Agent, or Firm* — Oblon, McClelland, Maier & Neustadt, L.L.P.

(57) ABSTRACT

A corrosion inhibitor composition, which includes i) an aqueous alcohol base fluid, ii) a mixture of at least three polysaccharides selected from carboxymethyl cellulose, gum arabic, pectin, a salt of alginic acid, chitosan, dextran, hydroxyethyl cellulose, and soluble starch, with each polysaccharide that is present in the mixture being present in an amount of 0.05 to 0.5 wt. %, based on a total weight of the corrosion inhibitor composition, iii) silver nanoparticles, and iv) a pineapple leaves extract. A method of inhibiting corrosion of metal during acid cleaning/pickling whereby the metal is treated with an acidic treatment fluid containing an acid and the corrosion inhibitor composition.

8 Claims, 5 Drawing Sheets

(56) References Cited

OTHER PUBLICATIONS

Andijani, et al. ; Corrosion behavior of titanium metal in the presence of inhibited sulfuric acid at 50° C. ; Desalination 129 ; pp. 45-51 ; 2000 ; 7 Pages.

Mogoda, et al. ; Corrosion inhibition of Ti-6Al-4V alloy in surface and hydrochloric acid solutions using inorganic passivators ; Materials and Corrosion ; Jun. 3, 2004 ; Abstract Only ;1 Page.

Carboxymethyl Cellulose/Silver Nanoparticles Composite: Synthesis, Characterization and Application as a Benign Corrosion Inhibitor for St37 Steel in 15% H2SO4 Medium, Solomon et al., ACS Appl. Mater. Interfaces 2017, 9, 6376-6389.

Characterization of active phenolic components in the ethanolic extract of Ananas comosus L. leaves using high-performance liquid chormatography with diode array detection and tandem mass spectrometry, C. Ma et al. / J. Chromatogr. A 1165 (2007) 39-44.

* cited by examiner ary. Mainier et al. evaluated the corrosion inhibition
METHOD FOR INHIBITING METAL CORROSION DURING ACID CLEANING OR PICKLING

CROSS-REFERENCE TO RELATED APPLICATIONS

The present application is a Divisional of U.S. application Ser. No. 16/526,021, now allowed, having a filing date of Jul. 30, 2019.

BACKGROUND OF THE INVENTION

Field of the Invention

The present invention relates to a corrosion inhibitor composition and methods of inhibiting corrosion during acid cleaning/pickling.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Titanium has become a choice metal for heat exchanger tubes in multi-stage flash desalination plants owing to its good heat transfer property and excellent erosion-corrosion properties. See I. N. Andijani, S. Ahmad, A. U. Malik. Corrosion behavior of titanium metal in presence of inhibited sulfuric acid at 50° C. Presented at the International Desalination Association World Congress on Desalination and Water Reuse, "The Value of Water in the 21st Century, San Diego, USA. 29 Aug. 1999; and I. N. Andijani, S. Ahmad, A. U. Malik, Corrosion behavior of titanium metal in presence of inhibited sulfuric acid at 50° C., Desalination 129 (2000) 45-51, each incorporated herein by reference in their entirety. Normally, a multi-stage flash (MSF) desalination process involves the heating of seawater in a brine heater at the temperature range of 40-70° C. One of the challenges often encountered during desalination operations is excessive scale formation, mainly calcium carbonate ($CaCO_3$) and magnesium hydroxide ($Mg(OH)_2$), and build-up inside the metallic tubes. This usually leads to MSF desalination system blockage. As a maintenance strategy, acid solutions (most commonly HCl or $H_2SO_4$ in the concentration range of 1-5%) are used as a descalant to clean the tubes. However, descaling processes using corrosive acid solutions are known to cause severe corrosion to titanium tubes. To guard against the corrosion of the metallic structures, corrosion inhibitors are added to the acid solution to help prevent corrosion. See F. B. Mainier, L. P. C. Monteiro, S. S. M. Tavares, F. R. Leta, J. M. Pardal, Evaluation of titanium in hydrochloric acid solutions containing corrosion inhibitors, IOSR Journal of Mechanical and Civil Engineering 10(1) (2013) 66-69; and M. A. Deyab, Corrosion inhibition of heat exchanger tubing material (titanium) in MSF desalination plants in acid cleaning solution using aromatic nitro compounds, Desalination 439 (2018) 73-79, each incorporated herein by reference in their entirety).

Several organic and inorganic corrosion inhibitors for titanium have been reported. For instance, Andijani et al. has reported CP-20, a β-ethylphenylketocyclohexyl amino hydrochloride corrosion inhibitor. See I. N. Andijani, S. Ahmad, A. U. Malik, Corrosion behavior of titanium metal in presence of inhibited sulfuric acid at 50° C., Desalination 129 (2000) 45-51, incorporated herein by reference in its entirety. Mainier et al. evaluated the corrosion inhibition efficacy of thiocarbamide, phenylamine, and β-naphthol for titanium in solutions of hydrochloric acid (10% by mass) at 50 and 70° C. It was found that these compounds exerted inhibition efficiency in the range 50 to 80%. See F. B. Mainier, L. P. C. Monteiro, S. S. M. Tavares, F. R. Leta, J. M. Pardal, Evaluation of titanium in hydrochloric acid solutions containing corrosion inhibitors, IOSR Journal of Mechanical and Civil Engineering 10(1) (2013) 66-69, incorporated herein by reference in its entirety. Aromatic nitro compounds have also been reported as effective corrosion inhibitors for titanium in acid cleaning solutions. See M. A. Deyab, Corrosion inhibition of heat exchanger tubing material (titanium) in MSF desalination plants in acid cleaning solution using aromatic nitro compounds, Desalination 439 (2018) 73-79, each incorporated herein by reference in their entirety. In the category of inorganic compounds, iodates, metavanadates, and molybdates have been found to effectively induce the surface passivation of titanium and its alloys in HCl and $H_2SO_4$ solutions. See A. S. Mogoda, Y. H. Ahmad, W. A. Badawy. Corrosion inhibition of Ti—6Al—4V alloy in sulfuric and hydrochloric acid solutions using inorganic passivators, Materials and Corrosion 55(6) (2004) 449-456, incorporated herein by reference in its entirety. Aromatic nitro compounds; hydroxylamine or its derivatives; compositions of n-iodobensal-2-amino-5-nitrophenol, 5-bromine-3-fluorine-butyl-6-methyluracil, and urotropin; and formulations of polyaspartic acid and ammonium molybdate at a mass ratio of 10:12 have also been described. See U.S. Pat. Nos. 2,962,356A, 7,012,051B2, RU 2,261, 292C2, and CN102330092A, each incorporated by reference in its entirety. However, these compounds/formulations may achieve only moderate effectiveness at preventing corrosion, may be expensive to make, and may be toxic to humans and the natural environment.

In view of the forgoing, there is a need for effective, low cost, and environmentally friendly corrosion inhibitors that can be used for preventing corrosion of metal during acid cleaning/pickling operations.

SUMMARY OF THE INVENTION

Accordingly, it is one object of the present invention to provide corrosion inhibitor compositions made primarily from natural polymers and plant extracts.

It is another object of the present invention to provide methods of inhibiting corrosion of metal(s) during acid cleaning/pickling operations by employing acidic treatment fluids containing an acid and the corrosion inhibitor compositions for the dual purpose of removing deposits such as scale from the metal while simultaneously protecting against corrosion.

Thus, the present invention provides:

A corrosion inhibitor composition which includes i) a base fluid containing water and an alcohol, ii) a mixture of at least three polysaccharides selected from the group consisting of carboxymethyl cellulose, gum arabic, pectin, a salt of alginic acid, chitosan, dextran, hydroxyethyl cellulose, and soluble starch, with each polysaccharide that is present in the mixture being present in an amount of 0.05 to 0.5 wt. %, based on a total weight of the corrosion inhibitor composition, iii) silver nanoparticles, and iv) a pineapple leaves extract.

In some embodiments, the alcohol is a monoalcohol.

In some embodiments, the alcohol is isopropanol.

In some embodiments, a ratio of water to the alcohol by volume is 2:1 to 1:2.

In some embodiments, three polysaccharides are present in the mixture.

In some embodiments, each of the three polysaccharides is present in an amount of 30 to 40 wt. %, based on a total weight of the mixture.

In some embodiments, the mixture consists of carboxymethyl cellulose, gum arabic, and pectin.

In some embodiments, the silver nanoparticles are present in an amount of 0.005 to 0.1 wt. % based on a total weight of the corrosion inhibitor composition.

In some embodiments, the silver nanoparticles are in the form of spherical nanoparticles having an average diameter of 30 to 100 nm.

In some embodiments, the pineapple leaves extract is an ethanolic pineapple leaves extract.

In some embodiments, the ethanolic pineapple leaves extract has a total phenolic content of 15 to 50 mg per 100 mL of the pineapple leaves extract, as determined with high-performance liquid chromatography.

In some embodiments, the pineapple leaves extract is present in an amount of 0.01 to 0.1 wt. %, based on a total weight of the corrosion inhibitor composition.

A method of inhibiting corrosion of metal during acid cleaning/pickling, whereby the method involves treating the metal with an acidic treatment fluid containing 1 to 5 wt. % of an acid, based on a total weight of the acidic treatment fluid, and 0.1 to 5 vol. % of the corrosion inhibitor composition, based on a total volume of the acidic treatment fluid.

In some embodiments, the corrosion inhibitor composition is present in the acidic treatment fluid in an amount of 0.3 to 1 vol. %, based on a total volume of the acidic treatment fluid.

In some embodiments, the acidic treatment fluid is acidified seawater, and the acid is hydrochloric acid.

In some embodiments, the metal is titanium.

In some embodiments, the metal is treated with the acidic treatment fluid at a temperature of 40 to 70° C.

In some embodiments, the metal is treated with the acidic treatment fluid under static conditions.

In some embodiments, the metal is treated with the acidic treatment fluid under hydrodynamic conditions, whereby the metal is contacted with the acidic treatment fluid at a flow rate of 0.5 to 5 m/s.

In some embodiments, the metal is present in a heat exchanger tube in a desalination plant, and the treating is performed to remove a buildup of scale on the heat exchanger tube.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
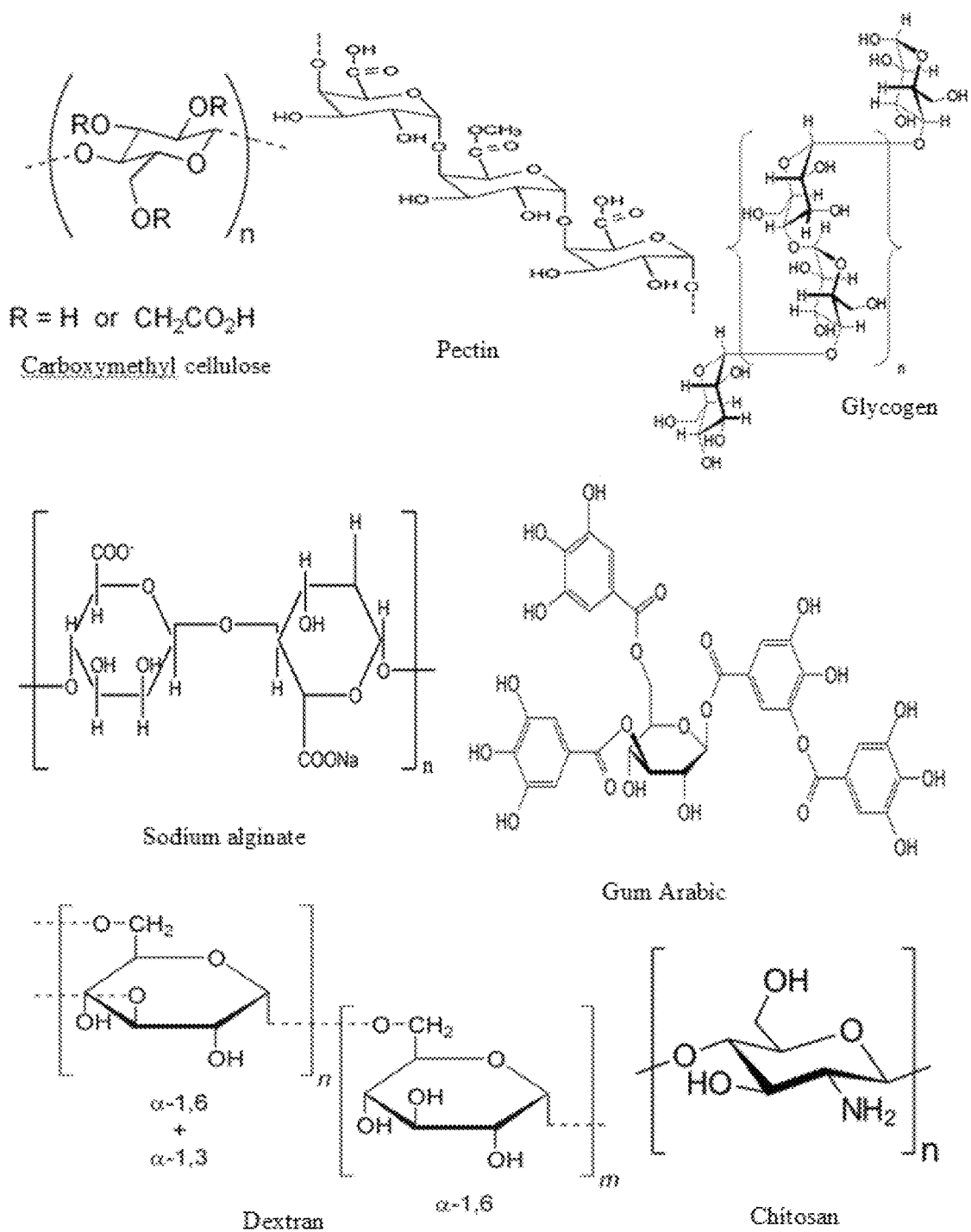
FIG. 1 illustrates the structures of some of the possible polysaccharides in the corrosion inhibitor composition.

In the following description, it is understood that other embodiments may be utilized and structural and operational changes may be made without departure from the scope of the present embodiments disclosed herein.

Definitions

As used herein, the term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly) oxybutylene (derived from butylene oxide, BO), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26 carbon atoms, preferably 2 to 24, preferably 3 to 22, preferably 4 to 20, preferably 5 to 18, preferably 6 to 16, preferably 7 to 14, preferably 8 to 12, preferably 9 to 10. Non-limiting examples include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), and unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to describe alkyl groups having 1 to 5 carbon atoms (e.g., methyl, ethyl, n-propyl, etc.).

As used herein, unless otherwise specified, the term "aryl" refers to an aromatic group containing only carbon in the aromatic ring(s), such as phenyl, biphenyl, naphthyl, anthracenyl, and the like. The term "heteroarene" or "heteroaryl" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, furan, benzofuran, thiophene, benzothiophene, isoxazole, pyrazole, triazole, tetrazole, indazole, purine, carbazole, imidazole, and benzimidazole.

As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C=O (e.g. —C(O)—Oalkyl), for example methyl ester, ethyl ester, and pivaloyl ester substitution where the carbonyl functionality is bound to the rest of the compound.

As used herein, "optionally substituted" means that at least one hydrogen atom is replaced with a non-hydrogen group, provided that normal valencies are maintained and that the substitution results in a stable compound. Such optional substituents may be selected from aryl, alkoxy, aryloxy, arylalkyloxy, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —CONH$_2$, —CONHalkyl, —CONHaryl, —CONHarylalkyl or cases where there are two substituents on one nitrogen), and the like.

As used herein, "inhibit" means prevent, retard, slow, hinder, reverse, remove, lessen, reduce an amount of, or delay an undesirable process or an undesirable composition, or combinations thereof.

As used herein the term "corrosion inhibitor" refers to a substance(s) or composition that inhibits the deterioration of a metal surface by oxidation or other chemical reaction. Corrosive substances that can cause corrosion include water with high salt contents, acidic inorganic compounds such as hydrochloric acid, hydrofluoric acid, carbon dioxide ($CO_2$) and/or hydrogen sulfide ($H_2S$), organic acids, and microorganisms. Preferred corrosion inhibitors of the present invention inhibit the destructive effect such substances have on various metal surfaces.

"Scale" is a mineral salt deposit or coating formed on the surface of metal, rock or other material. Scale is caused by a precipitation due to a chemical reaction with the surface, precipitation caused by chemical reactions, a change in pressure or temperature, or a change in the composition of a solution. Exemplary scales include, but are not limited to, calcium carbonate, magnesium hydroxide, calcium sulfate, barium sulfate, strontium sulfate, iron sulfide, iron oxides, iron carbonate, the various silicates and phosphates and oxides, or any of a number of compounds insoluble or slightly soluble in water.

As used herein, the terms "scale inhibitor" or "antiscalant" refers to a substance(s) that inhibits the accumulation or buildup of unwanted scale (including reverses, cleans, removes, or otherwise reduces/lessens an amount of scale already existing on a surface), for example those surfaces exposed to brine-containing solutions during desalination processes.

Corrosion Inhibitor Composition

The present disclosure provides a corrosion inhibitor composition. The corrosion inhibitor composition of the present disclosure may be effective for inhibiting corrosion of various metals caused by acidic fluids, in particular, the corrosion of titanium metals caused by acidic fluids used for the removal of scale from various process equipment, such as process equipment used in desalination operations where scale buildup is particularly problematic, as is the case in heat exchangers and utility steam condensers in multi-stage flash desalination plants.

The corrosion inhibitor composition disclosed herein generally comprises, consists essentially of, or consists of an aqueous alcohol base fluid, a mixture of polysaccharides, preferably three polysaccharides, silver nanoparticles that are preferably formed in situ, and a pineapple leaves extract.

Base Fluid

The base fluid typically accounts for the majority of the corrosion inhibitor composition, and is designed to aid solvation of the various ingredients as well as facilitate transfer of the corrosion inhibitor composition. In some embodiments, the corrosion inhibitor composition contains at least 90 wt. %, preferably at least 92 wt. %, preferably at least 94 wt. %, preferably at least 96 wt. %, preferably at least 98 wt. %, preferably at least 99 wt. %, preferably at least 99.2 wt. %, preferably at least 99.4 wt. %, preferably at least 99.6 wt. %, based on a total weight of the corrosion inhibitor composition.

The base fluid may be an aqueous alcohol base fluid comprising, consisting essentially of, or consisting of water and an alcohol. In some embodiments, a v/v ratio of water to the alcohol is from 3:1 to 1:3, preferably 2.5:1 to 1:2.5, preferably 2:1 to 1:2, preferably 1.5:1 to 1:1.5, preferably 1:1. In preferred embodiments, the base fluid consists of water and the alcohol.

The water may be distilled water, tap water, well water, purified water, or fresh water obtained from natural sources such as lakes, streams, rivers, etc.

The alcohol may be a monoalcohol, a polyalcohol, or a combination thereof. Exemplary monoalcohols include, but are not limited to, methanol, ethanol, propanol, isopropanol, n-butanol, isobutanol, n-pentanol, n-hexanol, 3-methyl-3-buten-1-ol, 2-ethyl-1-hexanol, 2-ethyl-1-butanol, 2-propylheptan-1-ol, and 2-butyl-1-octanol, including mixtures thereof. Exemplary polyalcohols include, but are not limited to, ethylene glycol, diethylene glycol, triethylene glycol, tetraethylene glycol, propylene glycol, dipropylene glycol, 1,3-propanediol, 1,3-butanediol, 1,4-butanediol, 1,6-hexanediol, glycerol, pentaerythritol, manitol, and sorbitol, including mixtures thereof. In preferred embodiments, the alcohol is a monoalcohol, preferably one of methanol, ethanol, propanol, isopropanol, and isobutanol, preferably isopropanol.

Other organic solvents may also be included in the base fluid (in addition to the alcohol described above), for example to aid solvation of the various ingredients of the corrosion inhibitor composition. The other organic solvent(s) may be added in amounts of 1 to 20 vol. %, preferably 3 to 15 vol. %, preferably 5 to 10 vol. %, preferably 6 to 8 vol. %, based on a total volume of the base fluid. The other organic solvent may any solvent that is miscible with water, preferably a polar aprotic solvent. Acceptable other organic solvents include, but are not limited to, formamide, dimethyl formamide, dimethyl acetamide, acetone, methyl ethyl ketone, ethylene glycol methyl ether, ethylene glycol ethyl ether, ethylene glycol propyl ether, and ethylene glycol butyl ether.

Mixture of Polysaccharides

The corrosion inhibitor compositions disclosed herein also include a mixture of polysaccharides, preferably a mixture of at least three polysaccharides, preferably a mixture of at least four polysaccharides, preferably a mixture of at least five polysaccharides. The polysaccharides may provide several benefits. Firstly, the polysaccharides may contribute to the overall anti-corrosivity of the corrosion inhibitor compositions as individual components, and in particularly when used in combination of three or more where synergistic anticorrosion effects are seen. Secondly, the polysaccharides may function as dispersants for the silver nanoparticles, and thus may aid in preventing the formation of silver nanoparticle agglomerates.

The polysaccharides employed herein are preferably polysaccharides obtained from natural sources or are semi-synthetic polysaccharides that can be easily derived from natural polysaccharides and produced easily, cheaply, and in large-scale. Examples of polysaccharides that may be included in the corrosion inhibitor compositions of the present disclosure include, but are not limited to, modified cellulose polymers (e.g., hydroxyethyl cellulose (HEC), hydroxypropylmethylcellulose (HPMC), methylcellulose (MC), and carboxymethyl cellulose (CMC)); gum arabic (*acacia*); pectin; a salt of alginic acid (e.g., sodium alginate, potassium alginate, ammonium alginate, and/or calcium alginate); chitosan; dextran; modified starch such as soluble starch (e.g., cold water soluble starches) and cold-water swellable starch; xanthan gum; guar gum; carrageenan; locust bean gum; agar; tapioca; inulin; glycogen, and covalently modified alginates (e.g., propylene glycol alginates); and mixtures thereof.

In preferred embodiments, the mixture is made up of at least three polysaccharides selected from the group consisting of carboxymethyl cellulose, gum arabic, pectin, a salt of alginic acid (e.g., sodium alginate), chitosan, dextran, hydroxyethyl cellulose, and soluble starch. Each of these polysaccharides may be optionally included in the mixture and will be briefly described below.

Carboxymethyl cellulose (CMC) is a cellulose derivative with carboxymethyl groups ($-CH_2-COOH$) bound to some of the hydroxyl groups of the glucopyranose monomers that make up the cellulose backbone (comprised of $\beta(1\rightarrow4)$ linked D-glucose units). Carboxymethyl cellulose may be in the form of a free acid or a carboxylate salt (e.g., sodium salt). The carboxymethyl cellulose employed in the present disclosure may have a degree of substitution, in terms of carboxymethyl groups per anhydroglucose unit in the cellulose backbone, of 0.6 to 1.4, preferably 0.7 to 1.3, preferably 0.8 to 1.2, preferably 0.9 to 1.1, preferably 1.0. In preferred embodiments, the carboxymethyl cellulose employed herein may have a weight average molecular weight of 80,000 g/mol to 800,000, preferably 90,000 g/mol to 700,000, preferably 100,000 g/mol to 600,000, preferably 120,000 g/mol to 500,000, preferably 140,000 g/mol to 400,000, preferably 160,000 g/mol to 300,000, preferably 180,000 g/mol to 250,000, preferably 200,000 g/mol to 220,000 g/mol. In preferred embodiments, the carboxymethyl cellulose is sodium carboxymethyl cellulose having a weight average molecular weight of 240,000 to 260,000 g/mol and a degree of substitution of 0.85 to 0.95;

Gum Arabic (also known as *acacia* gum) is a polydisperse natural gum collected from *acacia* species, predominantly *Acacia senegal* and *Vachellia* (*Acacia*) *seyal*, which is a complex mixture of glycoproteins and polysaccharides predominantly made from arabinose and galactose monomers. In some embodiments, the gum arabic employed in the present disclosure is a branched polymer comprising galactose, rhamnose, arabinose, and glucuronic acid as a mixed salt of calcium, magnesium, and potassium. In some embodiments, the gum arabic has a weight average molecular weight of 160,000 g/mol to 300,000, preferably 180,000 g/mol to 290,000, preferably 200,000 g/mol to 280,000, preferably 220,000 g/mol to 270,000, preferably 240,000 g/mol to 260,000, preferably 250,000 g/mol. The gum arabic used herein may be a spray dried form, for example a spray dried gum arabic with a weight loss of less than 10 wt. %, preferably less than 5 wt. %, preferably less than 3 wt. % on drying. The gum arabic may have a bulk density of 380 to 420 $kg/m^3$, preferably 390 to 410 $kg/m^3$, preferably 400 $kg/m^3$;

Pectin is a structural heteropolysaccharide, rich in galacturonic acid, contained in the primary cell walls of terrestrial plants. It is produced commercially as a white to light brown powder, mainly extracted from citrus fruits. Several distinct polysaccharides have been identified and characterized within the pectic group. Homogalacturonans are linear chains of $\alpha$-(1$\rightarrow$4)-linked D-galacturonic acid. Substituted galacturonans are characterized by the presence of saccharide appendant residues (such as D-xylose or D-apiose in the respective cases of xylogalacturonan and apiogalacturonan) branching from a backbone of D-galacturonic acid residues. Rhamnogalacturonan I pectins (RG-I) contain a backbone of the repeating disaccharide 4)-$\alpha$-D-galacturonic acid-(1,2)-$\alpha$-L-rhamnose-(1. From many of the rhamnose residues, sidechains of various neutral sugars branch off. The neutral sugars are mainly D-galactose, L-arabinose and D-xylose, with the types and proportions of neutral sugars varying with the origin of pectin. Another structural type of pectin is rhamnogalacturonan II (RG-II), which is a complex, highly branched polysaccharide with a backbone made exclusively of D-galacturonic acid units. In nature, around 80 percent of carboxyl groups of galacturonic acid are esterified with methanol. This proportion is decreased to a varying degree during pectin extraction. The ratio of esterified to non-esterified galacturonic acid is one factor that determines the properties of pectin. Pectins may be classified as high-ester pectins (more than half of all the galacturonic acid is esterified) or low-ester pectins (less than half of all the galacturonic acid is esterified). In some embodiments, the pectin utilized herein is a rhamnogalacturonan II (RG-II) pectin. In preferred embodiments, the pectin utilized herein is a rhamnogalacturonan I (RG-I) pectin. The pectin herein may be obtained from citrus peel or apple peel. In some embodiments, the pectin is a high ester pectin, preferably a pectin having 50 to 95%, preferably 52 to 94%, preferably 55 to 92%, preferably 60 to 90%, preferably 64 to 88%, preferably 68 to 86%, preferably 70 to 84%, preferably 72 to 82%, preferably 74 to 80%, preferably 76 to 78% of a total galacturonic acid content in the form of a methyl ester. In some embodiments, the pectin is a low ester pectin, preferably a pectin having less than 45%, preferably less than 40%, preferably less than 35%, preferably less than 30%, preferably less than 25%, preferably less than 20%, preferably less than 15%, preferably less than 10%, preferably less than 5% of a total galacturonic acid content in the form of a methyl ester. The non-esterified galacturonic acid units of the pectin used herein can be either free acids (carboxylic acid groups) or salts with sodium, potassium, and/or calcium. The molecular weight of pectin also varies depending on the origin of the pectin and the extraction conditions. In some embodiments, the pectin has a weight average molecular weight of 50,000 to 150,000 g/mol, preferably 60,000 to 140,000 g/mol, preferably 70,000 to 130,000 g/mol, preferably 80,000 to 120,000 g/mol, preferably 90,000 to 110,000 g/mol, preferably 100,000 g/mol;

Alginic acid is a polyuronic acid generally believed to consist of two uronic acids; mannuronic acid and guluronic acid, the proportions of which vary depending on factors such as, for example, seaweed species, plant age, and seasonal variation. Specifically, alginic acid is a linear copolymer with homopolymeric blocks of (1-4)-linked β-D-mannuronate (M) and its C-5 epimer α-L-guluronate (G) residues, respectively, covalently linked together in different sequences or blocks. Alginic acid in the form of mixed water insoluble salts, in which the principal cation is calcium, is present in seaweeds of the Class Phaeophyceae, typical examples of which include, but are not limited to, *Fucus vesiculosus, F. spiralis, Ascophyllum nodosum, Macrocystis pyrifera, Alaria esculenta, Laminaria longicruris, L. digitata, L. saccharina*, and *L. cloustoni*. Alginic acid salts such as sodium alginate, potassium alginate, ammonium alginate, calcium alginate, as well as mixed salt forms may be used herein. Methods for the recovery of water insoluble alginic acid and its water soluble salts, particularly sodium alginate, are well known, see for example U.S. Pat. No. 3,948,881A and references cited therein, incorporated herein by reference in its entirety. The structure, molecular weight, and thus the properties (viscosity) of the salt of alginic acid may depend on several factors, including but not limited to the seaweed origin, the extraction method, and the final salt form. In preferred embodiments, when a salt of alginic acid is employed in the corrosion inhibitor composition, sodium alginate is preferred. Preferably, the sodium alginate is extracted from brown algae, such as *Laminaria hyperborea, Laminaria digitata, Laminaria japonica, Ascophyllum nodosum*, and *Macrocystis pyrifera*. In some embodiments, the sodium alginate is a low viscosity type, having a viscosity less than 150 cP, preferably less than 100 cP, preferably less than 80 cP, preferably less than 60 cP, preferably less than 40 cP, preferably less than 20 cP, measured as a 1 wt. % solution in water. In some embodiments, the sodium alginate is a medium viscosity type, having a viscosity from 150 to 400 cP, preferably 175 to 375 cP, preferably 200 to 350 cP, preferably 225 to 300 cP, preferably 250 to 275 cP, measured as a 1 wt. % solution in water. In some embodiments, the sodium alginate is a high viscosity type, having a viscosity above 400 cP and up to 1,000 cP, preferably from 450 to 950 cP, preferably 500 to 900 cP, preferably 550 to 850 cP, preferably 600 to 800 cP, preferably 650 to 750 cP, preferably 700 cP. The weight average molecular weight of the sodium alginate may range from 32,000 to 400,000 g/mol, preferably 40,000 to 360,000 g/mol, preferably 60,000 to 320,000 g/mol, preferably 80,000 to 300,000 g/mol, preferably 100,000 to 260,000 g/mol, preferably 120,000 to 240,000 g/mol, preferably 140,000 to 200,000 g/mol. The sodium alginate salt may be in the form of crude particulates (for example having an average particle size of >200 μm and up to 3 mm), medium particulates (for example having an average particle size of 100 to 200 μm, preferably 120 to 180 μm, preferably 140 to 160 μm), or fine particulates (for example having an average particle size of 30 to 80 μm, preferably 40 to 70 μm, preferably 50 to 60 μm);

Chitosan, the deacylated form of chitin, is a linear polysaccharide composed of randomly distributed β-(1→4)-linked D-glucosamine (deacetylated unit) and N-acetyl-D-glucosamine (acetylated unit). Chitosan may be made by treating the chitin shells of crab, shrimp, squid, and other crustaceans or the cell walls of fungi either by enzymatic preparations or chemical hydrolysis using any procedure known by those of ordinary skill in the art, for example as disclosed in U.S. Pat. Nos. 7,544,785B2, 4,195,175A, and US20040215005A1—each incorporated herein by reference in its entirety. Chitosan materials derived from various sources, and having various chemical/physical properties (e.g., degree of deacetylation (DD), molecular weight distribution, viscosity, etc.) are generally effective when employed in the corrosion inhibitor compositions herein. The chitosan employed herein may be derived from chitin of animal sources, preferably shrimp shells. Alternatively, the chitosan may be derived from chitin of non-animal sources, preferably from fungal fermentation. The degree of deacetylation reflects the balance between the two kinds of monomeric residues in chitosan, and is defined as the molar fraction of deacylated units present, i.e., the average number of deacylated units (β-(1→4)-linked D-glucosamine) divided by the sum of the average number of both deacylated and acylated units, expressed as a percentage (Balazs, N., Sipos, P., Limitations of pH-potentiometric titration for the determination of the degree of deacetylation of chitosan, Carbohydrate Research, 342 (1), 124-130, 2007—incorporated herein by reference in its entirety). In some embodiments, the chitosan has a degree of deacetylation (DD) of at least 40%, preferably at least 50%, preferably at least 60%, preferably at least 70%, preferably at least 72%, preferably at least 74%, preferably at least 75%, preferably at least 78%, preferably at least 80%, preferably at least 82%, preferably at least 85%, and up to 99%, preferably up to 98%, preferably up to 96%, preferably up to 95%, preferably up to 93%, preferably up to 90%, preferably up to 88%. The DD may be determined by any method known by those of ordinary skill, for example, by NMR, IR, acid-base titrimetry, potentiometer titrimetry, or first derivative UV spectroscopy (Khan, T. A. et al. Reporting the degree of deacetylation values of chitosan: the influence of analytical methods, J Pharm. Pharmaceut. Sci. 2002, 5(3):205-212; Jiang, T. D. Chitosan; Chemical industry press: Beijing, China, 2001; pp. 91, 100, 108; Broussignac, P. Un polymere natural pecu cannu dans 1' industrie e chitosane. Chim. Ind.-Genie Chim. 1970, 99, 1241-1247; Muzzarelli, R. A. A.; Rocchetti, R. Determination of the degree of acetylation of chitosans by first derivative ultraviolet spectrophotometry. Carbohydr. Polym. 1985, 5, 461-472; Yuan, Y. et al. Materials, 2011, 4, 1399-1416— each incorporated herein by reference in its entirety). In some embodiments, the chitosan has a weight average molecular weight of 440 to 375,000 g/mol, preferably 500 to 350,000 g/mol, preferably 800 to 300,000 g/mol, preferably 1,000 to 250,000 g/mol, preferably 5,000 to 200,000 g/mol, preferably 10,000 to 150,000 g/mol, preferably 20,000 to 100,000 g/mol, as determined for example by size exclusion chromatography. In some embodiments, the chitosan has a viscosity (as a 1 wt. % solution in 1 wt. % acetic acid) of 20 to 3,000 cP, preferably 40 to 2,500 cP, preferably 60 to 2,000 cP, preferably 80 to 1,500 cP, preferably 100 to 1,000 cP, preferably 120 to 800 cP, preferably 140 to 600 cP, preferably 160 to 400 cP, preferably 180 to 300 cP, preferably 200 to 250 cP as determined by a viscometer (e.g., Brookfield viscometer made by AMETEK Brookfield) at 25° C.;

Dextran is a complex branched glucan (polysaccharide derived from the condensation of glucose), with a polymer main chain consisting of α-1,6 glycosidic linkages between glucose monomers, with branches from α-1,3 linkages (approximately 95% alpha-D-(1-6) linkages with the remaining α-(1-3) linkages accounting for the branching of dextran). This characteristic branching distinguishes a dextran from a dextrin, which is a straight chain glucose polymer tethered by α-1,4 or α-1,6 linkages. Dextran may be produced from sucrose by certain lactic acid bacteria of the family lactobacillus, such as *Leuconostoc mesenteroides* and *Streptococcus mutans*. The structure of dextran produced depends not only on the family and species of the bacterium but on the strain. Dextrans are typically separated by fractional precipitation from protein-free extracts using ethanol, as is known by those of ordinary skill in the art. In some embodiments, dextrans employed herein are derived from *Leuconostoc mesenteroides*, strain B 512. Dextrans can be produced in a wide range of molecular weights by limited hydrolysis and fractionation (e.g., size exclusion chromatography). In some embodiments, the dextran may have a weight average molecular weight of 1 to 2,000 kDa, preferably 2 to 1,500 kDa, preferably 3 to 1,000 kDa, preferably 4 to 800 kDa, preferably 5 to 600 kDa, preferably 8 to 400 kDa, preferably 10 to 200 kDa, preferably 15 to 100 kDa, preferably 20 to 50 kDa. In some embodiments, the dextran has a polydispersity ($M_w/M_n$) of 1.2 to 1.8, preferably 1.25 to 1.65, preferably 1.3 to 1.6, preferably 1.35 to 1.55, preferably 1.4 to 1.5, preferably 1.45;

Hydroxyethyl cellulose is a cellulose derivative with hydroxyethyl groups ($-CH_2CH_2OH$) bound to some of the hydroxyl groups of the glucopyranose monomers, similar to carboxymethyl derivatives of cellulose described above, typically made by hydroxyethylating the unsubstituted anhydroglucose units of cellulose with ethylene oxide. The hydroxyethyl cellulose employed in the present disclosure may have a molar substitution (M.S.), in terms of mols of hydroxyethyl groups per mol of cellulose, of 1.0 to 2.5, preferably 1.2 to 2.3, preferably 1.4 to 2.1, preferably 1.6 to 2.0, preferably 1.8 to 1.9. In preferred embodiments, the carboxymethyl cellulose employed herein may have a weight average molecular weight of 80,000 g/mol to 800,000, preferably 90,000 g/mol to 700,000, preferably 100,000 g/mol to 600,000, preferably 120,000 g/mol to 500,000, preferably 140,000 g/mol to 400,000, preferably 160,000 g/mol to 300,000, preferably 180,000 g/mol to 250,000, preferably 200,000 g/mol to 220,000 g/mol;

Soluble starches are starches that have been modified in some way to improve the functional solubility of the starch material (and in some cases other properties of the starch material such as the ability to withstand heat, shear, and acidic pH). The soluble starch employed herein may be modified via chemical and/or physical processes. Soluble starches may be chemically modified by oxidation, cross-linking, stabilization, and depolymerization. Soluble starches may be physically modified, for example, by pregalatinization. The soluble starch may be a stabilized starch (e.g., hydroxypropyl starches, starch acetates, starch octenylsuccinates, monostarch phosphate, etc.), a cross-linked starch (e.g., distarch phosphate, distarch adipate, etc.), a cross-linked and stabilized starch (e.g., hydroxypropylated distarch phosphate, phosphorylated distarch phosphate, acetylated distarch phosphate, acetylated distarch adipate, etc.), an oxidized starch (e.g., hypochlorite-oxidized starch, etc.), a thinned (depolymerized) starch such as those starches depolymerized by acid or base treatment (e.g., alcoholic-alkaline treated starch), and a physically processed starch such as pre-gelatinized starch. Any starch may be modified to produce the soluble starches of the present disclosure, for example starch derived from corn, potato, tapioca, wheat, rice, etc. Preferably the soluble starch is derived from common corn, waxy maize, or tapioca. Specific examples of soluble starches may include, but is not limited to, COLD WATER SOLUBLE STARCH VS-CS, PREGELATINIZED STARCH-MAIZE (VS-PMS), -POTATO (VS-PPS), each available from Visco Starch, INSTANT TEXTRA, available from Ingredion), and soluble starch (S9765) available from Sigma-Aldrich.

Each polysaccharide that is present in the mixture may be present in an amount of 0.05 to 0.5 wt. %, preferably 0.06 to 0.4 wt. %, preferably 0.07 to 0.35 wt. %, preferably 0.08 to 0.3 wt. %, preferably 0.09 to 0.25 wt. %, preferably 0.1 to 0.2 wt. %, preferably 0.105 to 0.15 wt. %, based on a total weight of the corrosion inhibitor composition.

In some embodiments, the mixture consists of three polysaccharides, wherein each of the three polysaccharides is present in an amount of 30 to 40 wt. %, preferably 31 to 38 wt. %, preferably 32 to 36 wt. %, preferably 33 wt. %, based on a total weight of the mixture. In preferred embodiments, the three polysaccharides are present in equivalent amounts (1:1:1 weight ratio or where each of the three polysaccharides is present in the mixture in an amount of 33 wt. %, based on a total weight of the mixture).

In some embodiments, the mixture contains (at least) carboxymethyl cellulose, gum arabic, and pectin. Preferably, the mixture contains carboxymethyl cellulose, gum arabic, and pectin, and is substantially free of all other polysaccharides (e.g., carrageenan, chitosan, alginic acid and salts, etc.). In preferred embodiments, the mixture consists of carboxymethyl cellulose, gum arabic, and pectin.

Silver Nanoparticles

The corrosion inhibitor composition also includes silver nanoparticles, preferably silver nanoparticles which are formed through the reduction of a silver salt in situ. The silver nanoparticles may be in the form of various shapes such as spheres, spheroids, ellipsoids or polygons, preferably in the form of spheres.

In some embodiments, the silver nanoparticles have an average diameter of 30 to 100 nm, preferably 40 to 90 nm, preferably 50 to 80 nm, preferably 60 to 70 nm. For particles with a polygonal shape, the term "diameter", as used herein, refers to the greatest possible distance measured from a vertex of a polygon through the center of the face to the vertex on the opposite side. For spheres, spheroids, ellipsoids and irregular-shaped particles, "diameter" refers to the greatest possible distance measured from one point on the particle through the center of the particle to a point directly across from it. The silver nanoparticles may be monodisperse. "Dispersity" is a measure of the homogeneity/heterogeneity of sizes of particles in a mixture. The coefficient of variation (CV), also known as relative standard deviation (RSD) is a standardized measure of dispersion of a probability distribution. It is expressed as a percentage and may be defined as the ratio of the standard deviation ($\sigma$) to the mean ($\mu$, or its absolute value $|\mu|$), and it may be used to show the extent of variability in relation to the mean of a population. The silver nanoparticles may have a narrow size dispersion, i.e., are monodisperse, with a coefficient of variation of less than 30%, preferably less than 25%, preferably less than 20%, preferably less than 15%, preferably less than 12%, preferably less than 10%, preferably less than 8%, preferably less than 5%, preferably less than 3%, with the coefficient of variation being defined in this context as the ratio of the standard deviation to the mean diameter of the silver nanoparticles, as calculated using transmission electron microscopy for example. Alternatively, the silver nanoparticles may be polydisperse, i.e., have a wide size distribution, with a coefficient of variation of at least 30%, preferably at least 35%, preferably at least 40%, preferably at least 45%, preferably at least 50%, preferably at least 55%, preferably at least 60%.

Various amounts of silver nanoparticles may be used in the corrosion inhibitor compositions for effective corrosion inhibition, however, typical amounts may range from 0.005 to 0.1 wt. %, preferably 0.006 to 0.09 wt. %, preferably 0.008 to 0.08 wt. %, preferably 0.01 to 0.07 wt. %, preferably 0.012 to 0.06 wt. %, preferably 0.014 to 0.05 wt. %, preferably 0.016 to 0.04 wt. %, preferably 0.018 to 0.03 wt. %, preferably 0.02 to 0.025 wt. %, preferably 0.021 to 0.022 wt. %, based on a total weight of the corrosion inhibitor composition.

As will be discussed hereinafter, the silver nanoparticles are preferably formed in situ through reduction of a silver salt by a pineapple leaves extract. After being reduced, the silver nanoparticles may also be stabilized by the pineapple leaves extract and/or one or more of the polysaccharides present in the mixture, and are thus preferably homogeneously dispersed throughout the corrosion inhibitor composition as separated particles, i.e., the silver nanoparticles preferably do not agglomerate/form silver agglomerates as they are being/once they are reduced. Preferably, an average distance between the silver nanoparticles, measured as the distance between an outer surface of a first nanoparticle to an outer surface of a second nanoparticle located closest to the first nanoparticle, ranges from 10 to 200 nm, preferably 20 to 150 nm, preferably 30 to 100 nm, preferably 40 to 80 nm.

Without being bound by theory, it is believed that the silver nanoparticles, once reduced, are incorporated/encapsulated into the biopolymer matrix formed from the mixture of polysaccharides. The pineapple leaves extract, as discussed below, is believed to act as the reducing agent for the in situ reduction of the silver salts, and also as a capping agent/dispersant to prevent agglomeration of the newly silver nanoparticles.

In preferred embodiments, all of the silver salt is reduced to form silver nanoparticles, and thus the corrosion inhibitor composition is preferably substantially free of silver salts, preferably substantially free of silver(I) salts (i.e., $Ag^I$ ions).

Pineapple Leaves Extract

The corrosion inhibitor compositions also include a pineapple extract. It has been found that the pineapple extract provides the corrosion inhibitor compositions with particularly beneficial anticorrosion properties. The pineapple extract may not only act as a reducing agent for converting silver salts into the silver nanoparticles, but it is believed that the pineapple extract may also serve as a capping/dispersing agent for the silver nanoparticles, preventing their agglomeration, thereby enhancing the anticorrosion effects of the corrosion inhibitor compositions.

*Ananas comosus* (L.) Merr. (family Bromeliaceae), commonly known as pineapple, has long been one of the most popular of tropical and subtropical fruits. It is grown extensively in Hawaii, Philippines, Caribbean area, Malaysia, Taiwan, Thailand, Australia, Mexico, Kenya, South Africa, Hainan province of China among many other locations. Besides agricultural utilities, such as being a fruit with nutritional value, many parts of the pineapple have been harvested for various uses, such as the pineapple fruit, residual pulp, stem, peel, and leaves. Each of these parts contain a different chemical constitution that can be used for varying applications and benefits. For example, the pineapple stem and fruit are commonly of interest because they contain a relatively high content of bromelain, a protein digesting enzyme possessing anti-inflammatory properties. Pineapple leaves are typically harvested for their fibers (pineapple leaf fibers or PALF), which have excellent mechanical properties and can be in various textiles and as reinforcing fibers in various composites. Pineapple peel has been used for the alkali extraction of ferulic acid, a phenolic antioxidant found in the peel.

For making an extract, in addition to the part of the pineapple harvested, the extraction procedure, particularly the extraction solvent, dictates the chemical make-up of the extract, as is well understood in the art (see for example Upadhyay, A. et al, "Utilization of Pineapple Waste: A Review" Journal of Food Science and Technology Nepal, 6, 10-18; Kaushik, J. et al. "Phytochemical Screening, Antioxidant and Anti-Microbial Activity of Polyphenolic Flavonoids Isolated from fruit of *Ananas comosus* in various solvents" International Journal of Scientific and Research Publications, 2018, 8(2), 31-55, each incorporated herein by reference in its entirety.

The pineapple extract used in the corrosion inhibitor composition is preferably a pineapple leaves extract. Pineapple leaves typically contain carbohydrates, alkaloids, saponins, sterols/terpenes, flavanoids, tannins, phenolic compounds, proteins, amino acids, phytosterol, and glycosides. The pineapple leaves extract may be employed in varying quantities with beneficial effect, though the pineapple leaves extract is typically employed in an amount of 0.005 to 0.5 wt. %, preferably 0.006 to 0.3 wt. %, preferably 0.008 to 0.2 wt. %, preferably 0.01 to 0.1 wt. %, preferably 0.02 to 0.09 wt. %, preferably 0.03 to 0.08 wt. %, preferably 0.04 to 0.06 wt. %, preferably 0.05 wt. %, preferably based on a total weight of the corrosion inhibitor composition.

The pineapple extract is preferably obtained from extraction of pineapple leaves with an ethanolic solvent, for example 80 to 100 wt. % ethanol, preferably 85 to 95 wt. % ethanol, preferably 90 wt. % ethanol (the balance being water).

In one example, the ethanolic pineapple leaves extract may be obtained by drying the *Ananas comosus* leaves for example at room temperature or under sun-drying conditions, and the dried leaves may then be powdered/ground, for example with an electrical grinder. The powdered leaves may be optionally delipidated with a hydrocarbon solvent (e.g., petroleum ether, pentane, hexane, heptane, etc.) at 20 to 80° C., preferably 40 to 60° C. prior to extraction. Extraction may be performed, for example, using a soxhlet extractor or similar extraction apparatus with an ethanolic solvent described above under conditions of reflux, preferably with 95 wt. % ethanol. Alternatively, extraction may be performed using cold extraction techniques, for example by soaking or stirring the powdered leaves in the ethanolic solvent for an extended period, such as for 24 to 96 hours, preferably 48 to 72 hours. In either case, the extraction supernatant may be separated from any bulk solid material, for example by filtration, and the ethanolic solvent may then be evaporated from the extract, for example using a rotary evaporator under reduced pressure and optional elevated temperature (e.g., 40 to 50° C.) to provide the ethanolic pineapple leaves extract as the remaining solid residue. When ethanolic solvents are used containing relatively high amounts of water, such as when 80 wt. % ethanol solutions are used as the extraction solvent, the method may optionally involve further drying operations, for example using heat baths, ovens, or vacuum drying, to remove excess water. Typical yields of the ethanolic pineapple leaves extract may range from 15 to 30%, preferably 25 to 28%, preferably 26% w/w of the dried leaf material (Kalpana, M. B. et al. "Studies on the antidiabetic activity of *Ananas comosus* leaves in STZ induced diabetic rats" Der Pharmazia Lettre, 2014, 6(2), 22-30, incorporated herein by reference in its entirety).

The ethanolic pineapple leaves extract may contain, as considerable constituents, alkaloids, flavonoids, tannins, phytosterols, glycosides, soluble carbohydrates, and phenolic compounds, but is typically substantially free of saponins, diterpenes, triterpenes, and anthraquinones.

The ethanolic pineapple leaves extract may contain phenolic compounds, and in particular phenolic acids. Exemplary phenolic compounds which may be present in the ethanolic pineapple leaves extract include, but are not limited to, hydroxycinnamic acids such as caffeic acid and p-coumaric acid; hydroxycinnamoyl quinic acids such as chlorogenic acid, 3-O-p-coumaroxylquinic acid, 4-O-p-coumaroxylquinic acid, and 5-O-p-coumaroxylquinic acid; phenylpropane monoglycerides such as 1-O-caffeoylglycerol, 2-O-caffeoylglycerol, 1-O-p-coumaroylglycerol, 2-O-p-coumaroylglycerol, and 1-O-caffeoylglycerol; and phenylpropane diglycerides such as 1,3-O-dicaffeoylglycerol (ananasate), 1,2-O-dicaffeoylglycerol, 1-O-p-coumaroyl-3-O-feruloylglycerol or its isomers (e.g., 1-O-p-coumaroyl-2-O-feruloylglycerol or 1-O-feruloyl-2-O-p-coumaroylglycerol), a mixed ester of p-coumaric acid and caffeic acid (e.g., 1-O-p-coumaroyl-3-O-caffeoylglycerol, 1-O-p-coumaroyl-2-O-caffeoylglycerol or 1-O-caffeoyl-2-O-p-coumaroylglycerol), a mixed ester of ferulic acid and caffeic acid (e.g., 1-O-feruloyl-3-O-caffeoylglycerol, 1-O-feruloyl-2-O-caffeoylglycerol or 1-O-caffeoyl-2-O-feruloylglycerol).

In preferred embodiments, the ethanolic pineapple leaves extract has a total phenolic content of 15 to 50 mg, preferably 16 to 45 mg, preferably 18 to 40 mg, preferably 20 to 35 mg, preferably 21 to 30 mg, preferably about 22 mg per 100 mL of the pineapple leaves extract, as determined with high-performance liquid chromatography (HPLC) according to the method reported by Mattila et al. (Mattila, P., J. Astola, and J. Kumpulainen, "Determination of Flavonoids in Plant Material by HPLC with Diode-Array and Electro-Array Detections", Journal of Agricultural and Food Chemistry, 2000, 48, 5834-5841).

The ethanolic pineapple leaves extract may also contain soluble carbohydrates, such as reducing sugars. In some embodiments, the ethanolic pineapple leaves extract contains a reducing sugar content of 3 to 7 wt. %, preferably 4 to 6 wt. %, preferably 5 to 5.5 wt. %, based on a total weight of the extract, as measured by alkaline 3,5 dinitrosalicyicacid (DNS) method (G. L. Miller., Anal. Chem., 1972, 31,426, incorporated herein by reference in its entirety). Exemplary reducing sugars which may be present in the ethanolic pineapple leaves extract may include, but are not limited to, aldohexoses such as glucose, galactose, mannose; aldopentoses such as arabinose, xylose; and hexose deoxy sugars such as fucose and rhamnose.

In some embodiments, the ethanolic pineapple leaves extract may contain phytosterols such as beta-sitosterol and daucosterol.

In some embodiments, the ethanolic pineapple leaves extract described above may be subjected to resin column fractionation to purify and isolate certain fractions, for example, those fractions which are rich in phenolic compounds (Xie, W. et al. "Hypolipidemic Mechanisms of *Ananas comosus* L. Leaves in Mice: Different From Fibrates but Similar to Statins" Journal of Pharmacological Sciences, 2007, 103, 267-274; Ma, Chao et al. "Characterization of active phenolic components in the ethanolic extract of *Ananas comosus* L. leaves using high-performance liquid chromatography with diode array detection and tandem mass spectrometry" Journal of Chromatography A, 2007, 1165(1-2), 39-44, each incorporated herein by reference in its entirety). For example, the extraction supernatant obtained from above may be loaded onto a resin column preconditioned with ethanol (e.g., 95 wt. % ethanol). Then, the supernatant of the crude extract may be eluted with distilled water until no sugar was detected with a sulfuric acid—phenol colorimetric method. Subsequently, the column may be eluted with aqueous ethanol (e.g., 80 to 90 wt. %) and a phenolic rich fraction may be collected and dried for example under vacuum or heat. The resulting phenolic rich ethanolic pineapple leaves extract may have a total phenolic content of 50 to 60 wt. %, preferably 52 to 58 wt. %, preferably 54 to 56 wt. %, based on a total weight of the phenolic rich ethanolic pineapple leaves extract, including the following phenolic compounds: p-coumaric acid (1 to 2 wt. %, preferably 1.5 wt. %), 1-O-p-coumaroylglycerol (0.1 to 0.4 wt. %, preferably 0.3 wt. %), caffeic acid (0.5 to 2 wt. %, preferably 1.0 wt. %), 1-O-caffeoylglycerol (0.1 to 0.3 wt. %, preferably 0.2 wt. %) and ananasate (1,3-O-dicaffeoylglycerides) (0.05 to 0.1 wt. %, preferably 0.066 wt. %) by HPLC analysis. The phenolic rich ethanolic pineapple leaves extract may then be used in the corrosion inhibitor compositions of the present disclosure, in the amount described previously.

It should be noted that other extracts (e.g., plant extracts) such as date palm leaf extract may be used in lieu of, or in addition to the pineapple leaves extract in the present disclosure. However, the pineapple leaves extract has been found to act synergistically with the silver nanoparticles and the mixture of polysaccharides, and thus, in preferred embodiments, the only extract (e.g., plant extract) present in the corrosion inhibitor composition is the pineapple leaves extract, preferably the ethanolic pineapple leaves extract, and any of the polysaccharides present in the mixture which can be categorized as extracts. In some embodiments, the corrosion inhibitor composition is substantially free of date palm seed extract, date palm leaf extract, *Zenthoxylum alatum* plant extract, *Schinopsis lorentzii* extract, *Aquilaria subintergra* leaves extract, *Rollinia occidentalis* extract, *Thymus algeriensis* extract, *Olea europaea* extract (e.g., olive leaves extract), and *Acalypha tortes* leaf extract.

In some embodiments, the corrosion inhibitor composition is substantially free of pineapple extracts obtained from non-leaf portions of a pineapple plant (*Ananas comosus*), such as pineapple stem extracts, pineapple fruit extracts, pineapple residual pulp extracts, pineapple peel extracts, and the like. In preferred embodiments, the corrosion inhibitor composition is substantially free of pineapple leaf fibers (PALF) or pineapple hemp fibers. In some embodiments, the corrosion inhibitor composition is substantially free of bromelain.

Preferably, besides the pineapple leaves extract, no other reducing agents are present in the corrosion inhibitor compositions disclosed herein, with specific mention being made to, other plant extracts (as described above, for example date palm leaf extract), microorganisms, fungi honey (e.g., mad honey), hydrazine, sodium sulfide, sodium borohydride, trisodium citrate, and dimethyl formamide.

In preferred embodiments, the corrosion inhibitor compositions are substantially free of polymers other than the biopolymers of the mixture of polysaccharides and any natural polymers present in the pineapple leaves extract, with specific mention being made to homopolymers or copolymers of polyethylene glycol, polypropylene glycol, styrene, vinyl chloride (PVC polymers), acrylonitrile-butadiene-styrene (ABS polymers), polycarbonates, (meth) acrylic acid and its salts, maleic acid (or anhydride) and its salts, styrene sulfonic acid and its salts, vinyl sulfonic acid and its salts, vinylpyridine, vinylimidazole, diallylamines which cyclopolymerized to give pyrrolidine functional groups, allyamine, vinylamine (derivatives of vinylacet-amine polymers), dimethylaminoethyl acrylate and 2-(ac-etoacetyl)ethyl methacrylate allyl sulfonic acid and its salts, acrylamidopropyl sulfonic acid and its salts, diallyldimethyl ammonium salts (e.g., DADMAC), diallyl di(beta-hydroxyethyl) ammonium chloride, and diallyl di(beta-ethoxyethyl) ammonium chloride, aminoalkyl acrylates such as dimethylaminoethyl acrylate, diethylaminoethyl acrylate, and 7-amino-3,7-dimethyloctyl acrylate, and their salts including their alkyl and benzyl quaternized salts; N,N'-dimethylaminopropyl acrylamide and its salts, allylamine and its salts, diallylamine and its salts, including mixtures thereof.

In preferred embodiments, the corrosion inhibitor compositions herein are substantially free of siliceous sedimentary deposits, clays (e.g., phyllosilicate clays), and minerals, including, but not limited to, diatomite (diatomaceous earth), bentonite, montomorrilonite, illite, bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, fullers earth, and halloysite.

In preferred embodiments, the corrosion inhibitor composition consists of the aqueous alcohol base fluid, the mixture of polysaccharides (preferably carboxymethyl cellulose, gum arabic, and pectin), silver nanoparticles that are preferably formed in situ, and a pineapple leaves extract (preferably an ethanolic pineapple leaves extract).

Making the Corrosion Inhibitor Composition

One suitable method for making the corrosion inhibitor composition will now be described, although it should be understood that many other methods, variations, and process equipment may utilized, which are generally known to those of ordinary skill in the art, and the corrosion inhibitor composition may still function as intended.

Briefly, the aqueous alcohol base fluid may first be provided or prepared having an acceptable v/v ratio of water to the alcohol as described above. Next each of the polysaccharides to be included may be mixed with the aqueous alcohol base fluid until complete dissolution, with optional agitation such as swirling, stirring, or sonication, thereby providing a natural polymer-base fluid solution. A silver salt, preferably a silver(I) salt, may next be added into the natural polymer-base fluid solution and agitated (e.g., stirred) for 10 to 30 minutes, preferably 15 to 25 minutes, preferably 20 minutes to obtain a silver salt mixture. Non-limiting examples of silver(I) salts include, but are not limited to, silver nitrate, silver acetate, silver sulfate, silver nitrite, silver salicylate, silver carbonate, silver phosphate, and silver benzoate, preferably silver(I) nitrate is employed. A concentration of the silver(I) salt in the silver salt mixture typically ranges from 0.1 to 2 mM, preferably 0.2 to 1.5 mM, preferably 0.3 to 1 mM, preferably 0.4 to 0.8 mM. Thereafter, the pineapple leaves extract may be added in several batches, or, preferably, all at once, and the resulting yellow color mixture may be allowed to stand at 20 to 40° C., preferably 22 to 35° C., preferably 25 to 30° C. for an extended period, typically for 12 to 96 hours, preferably 24 to 90 hours, preferably 36 to 80 hours, preferably 48 to 72 hours, or until a dark-yellow viscous solution is obtained signaling the complete conversion of the silver ions from the silver(I) salt into the silver nanoparticles.

Methods of Inhibiting Corrosion

Scale deposits are formed by the precipitation and crystal growth of solid salts, oxides and hydroxides at a surface in contact with fluids containing such salts/oxides/hydroxides. In industrial fluids, such as produced waters in oil and gas extraction, process waters in mineral processing, and saline water such as sea water in desalination processes, alkaline earth metal cations or transition metals cations are generally present, including calcium, barium, and magnesium, along with their anion counterparts, including bicarbonate, carbonate, sulfate, phosphate, and silicate. Precipitation of these ions occurs when solubility is exceeded either in the bulk fluid or at the interface between a solid surface and the bulk fluid, or where high levels of dissolved solids are present, and particularly at the surfaces where heat transfer occurs such as on heat exchanger coils/pipes, autoclaves, and utility steam condensers.

Many industrial processes suffer from scale formation, with specific mention being made to desalination systems, cooling water systems, chemical process industries, mining, mineral processing, refineries, energy and geothermal, oil and gas exploration and production, utility industries, pulp and paper processing, food and beverage processing (e.g., molasses transport), and coal slurry transport processes. For example, mineral leaching equipment (e.g., carbon in leach circuits, tank leaching, carbon in pulp circuits, etc.), pressure oxidation equipment, flotation devices, thickener overflow and sedimentation basins, oil and gas production and transportation pipelines, and desalination heat exchange equipment are all known to experience issues with scale buildup. Scale deposits may be of particular concern when formed on heat transfer equipment, such as heat exchangers, autoclaves, and utility steam condensers, since scale has been shown to reduce the heat transfer efficiency of such equipment (U.S. Pat. No. 4,454,046, incorporated herein by reference in its entirety), leading to increased cleaning costs and equipment damage and/or failure. These problems ultimately cause losses in production, increased operating costs and increased capital equipment expenditures.

To remove scale buildup, the industry often turns to acidic treatment fluids/pickle liquors for removing scale. However, the use of such acidic treatments may have the unintended drawback of causing metal corrosion.

Therefore, the present disclosure relates to a method of inhibiting corrosion of metal during acid cleaning/pickling operations, for example acid cleaning/pickling operations to remove scale deposits from desalination equipment. The method involves treating the metal with an acidic treatment fluid that contains an acid and the corrosion inhibitor composition for the dual purpose of removing scale and/or other unwanted deposits from the metal surface while simultaneously guarding that metal surface against corrosion.

The acidic treatment fluid may be useful for removing various types of scale including, but not limited to, calcium carbonate, calcium sulfate, calcium phosphate, barium sulfate, barium carbonate, magnesium hydroxide, strontium sulfate, strontium carbonate, iron sulfide, iron oxides, iron carbonate, colloidal silica (polymerized silica particles), and mixtures thereof, as well as the various silicate, phosphate, and/or oxide variants of any of the above, or any scale formed from any combination of cations and anions listed above, or any of a number of compounds insoluble or slightly soluble in water, with specific mention being made to calcium carbonate and magnesium hydroxide scales common to desalination processes. In some embodiments, the methods herein are employed for combating mixed scales.

Acidic Treatment Fluid

The acidic treatment fluid of the present disclosure generally contains an acid and the corrosion inhibitor composition.

The acidic treatment fluid may contain a variety of acids, preferably water-soluble acids. Suitable acids include, but are not limited to, hydrochloric acid, formic acid, acetic acid, chloroacetic acid, hydrofluoric acid, sulfuric acid, sulfamic acid, as well as mixtures thereof, for example mud acid (mixtures of HCl and HF). In preferred embodiments, the acid is hydrochloric acid (HCl). Typically, the acidic treatment fluid contains 0.5 to 10 wt. % of the acid, preferably 1 to 5 wt. % of the acid, preferably 1.5 to 4.5 wt. % of the acid, preferably 2 to 4 wt. % of the acid, preferably 2.5 to 3.5 wt. % of the acid, preferably 3 wt. % of the acid, based on a total weight of the acidic treatment fluid, although more concentrated or dilute versions may also be used in some circumstances.

In some embodiments, the acidic treatment fluid is formed from acidified fresh water sources, such as distilled water, tap water, well water, purified water, or fresh water obtained from natural sources such as lakes, streams, rivers. In some embodiments, the acidic treatment fluid is formed from wastewater, which may be fresh wastewater or salt-containing wastewater. As used herein, "wastewater" means a water source obtained from storm drains, sedimentation ponds, runoff/outflow, landfills, as well as water sources resulting/obtained from industrial processes such as factories, mills, farms, mines, quarries, desalination plants, industrial drilling operations, oil and gas recovery operations, papermaking processes, food preparation processes, phase separation processes, washing processes, waste treatment plants, toilet processes, power stations, incinerators, spraying and painting, or any other manufacturing or commercial enterprise, which comprises water and one or more compounds or materials derived from such industrial processes, including partially treated water from these sources.

In some embodiments, the acidic treatment fluid is formed from seawater (i.e., the acidic treatment fluid is acidified seawater). The acidified seawater may have a total dissolved solids content of, for example, 30,000 to 40,000 ppm, preferably 31,000 to 39,000 ppm, preferably 32,000 to 38,000 ppm, preferably 33,000 to 37,000 ppm, preferably 34,000 to 36,000 ppm, preferably 35,000 ppm.

When the acidic treatment fluid contains salts, such as when acidified seawater is employed, representative examples of cations which may be optionally present in the acidic treatment fluid include, but are not limited to, sodium, potassium, magnesium, calcium, strontium, barium, iron (ferrous and ferric), lead, copper, cobalt, manganese, nickel, zinc, aluminum, chromium, and titanium, as well as mixtures thereof. Representative examples of anions which may be present in the acidic treatment fluid include, but are not limited to, chloride, carbonate, bicarbonate, sulfate, bromide, iodide, acetate, hydroxide, sulfide, hydrosulfide, chlorate, fluoride, hypochlorite, nitrate, nitrite, perchlorate, peroxide, phosphate, phosphite, sulfite, hydrogen phosphate, hydrogen sulfate, as well as mixtures thereof.

Various amounts of the corrosion inhibitor composition may be employed in the disclosed methods for effective corrosion inhibition. Typically, the corrosion inhibitor composition is present in the acidic treatment fluid in an amount of 0.1 to 5 vol. %, preferably 0.2 to 4 vol. %, preferably 0.3 to 3 vol. %, preferably 0.4 to 2 vol. %, preferably 0.5 to 1.5 vol. %, preferably 0.6 to 1.2 vol. %, preferably 0.8 to 1 vol. %, based on a total volume of the acidic treatment fluid.

The acidic treatment fluid may also optionally include one or more of an intensifier, a surfactant, a supplemental antiscalant, a supplemental corrosion inhibitor, and an additive.

Intensifier

In some situations, for example, under particularly acidic conditions, the acidic treatment fluid may optionally further include one or more intensifiers to further diminish the rate of corrosion. Suitable intensifiers may include, but are not limited to, carboxylic acid compounds having 1 to 12 carbon atoms or an ester (including protected carboxylic acid derivatives) or salt thereof, such as formic acid, acetic acid, oxalic acid, glycolic acid, propionic acids/esters/salts (e.g., propionic acid, 2-hydroxypropionic acid, 3-hydroxypropionic acid, 2-methoxypropionic acid, 3-methoxypropionic acid, 2-hydroxypropionic acid methyl ester, 3-hydroxypropionic acid methyl ester, 2-methoxypropionic acid methyl ester, 3-methoxypropionic acid methyl ester, sodium 2-hydroxypropionate, sodium 3-hydroxypropionate, sodium 2-methoxypropionate, and sodium 3-methoxypropionate), lactic acid, butanoic acid, isobutyric acid, pentanoic acid, arabinaric acid, glucaric acid, tartaric acid, 1,1-cyclobutanedicarboxylic acid, 2-(2-propynyl)malonic acid, 2,2-bis(hydroxymethyl)butanoic acid, 2,2-bis(hydroxymethyl)propionic acid, 2,2-diethylmalonic acid, 2,2-dihydroxymalonic acid hydrate, 2,2-dimethyl-1,3-dioxane-4,6-dione, 2,2-dimethylmalonic acid, 2-allylmalonic acid, 2-amino-2,4,5-trideoxypentonic acid, 2-butylmalonic acid, 2-ethylmalonic acid, 2-hydroxy-2-methyl succinic acid, 2-isopropylmalonic acid, 2-methylmalonic acid, 2-methylserine, 3-(acryloyloxy)propanoic acid, 3-ethoxy-2-methyl-3-oxopropanoic acid, 3-ethoxypropanoic acid, 3-hydroxy-2-(hydroxymethyl)-2-methylpropanoic acid, 3-hydroxy-2,2-dimethylpropanoic acid, 3-hydroxy-2-oxopropanoic acid, 3-hydroxy-3-methylbutanoic acid, 3-hydroxybutanoic acid, 3-hydroxyproline, 3-methoxy-2-methyl-3-oxopropanoic acid, 3-methoxy-3-oxopropanoic acid, 3-methoxyalanine, 3-methoxybutanoic acid, 3-methoxypropanoic acid, 3-methoxyvaline, 4-amino-3-hydroxybutanoic acid, 4-hydroxy-4-methyltetrahydro-2H-pyran-2-one, 4-methyl-5-oxotetrahydro-3-furancarboxylic acid, diethyl malonate, dimethyl 2-ethylidenemalonate, dimethyl 2-methylmalonate, dimethyl malonate, disodium malonate, ethyl 3-ethoxypropanoate, ethyl 3-hydroxybutanoate, hydroxydihydro-2(3H)-furanone, lithium 3-hydroxy-2-oxopropanoate, malic acid, malonic acid, methyl 2-(1-hydroxyethyl)acrylate, methyl 2-amino-3-hydroxybutanoate, methyl 2-amino-3-hydroxypropanoate hydrochloride, methyl 2-oxo-2H-pyran-3-carboxylate, methyl 3,3-dimethoxypropanoate, methyl 3-hydroxy-2-(hydroxymethyl)-2-methylpropanoate, methyl 3-hydroxy-2,2-dimethylpropanoate, methyl 3-hydroxyhexanoate, methyl 3-methoxypropanoate, N-acetylserine, potassium 3-methoxy-3-oxopropanoate, serine, sodium 3-hydroxybutanoate, sodium malonate dibasic monohydrate, tartronic acid, and threonine, for example, those carboxylic acids/esters/salts/protected derivatives described in WO 2007007025 A1—incorporated herein by reference in its entirety;

formates such as $C_1$-$C_4$ alkyl formates (e.g., methyl formate and ethyl formate), aryl formates, and arylalkyl formates (e.g., benzyl formate);

formamides such as formamide, dimethyl formamide, 1,1'-azobisformamide;

metal halides such as sodium chloride, sodium bromide, potassium bromide, sodium iodide, potassium iodide, copper(I) chloride, copper(I) iodide, copper(II) chloride, copper(II) iodide, antimony chloride;

as well as combinations thereof.

When employed, the intensifier may be present in a concentration of 0.001 to 3 wt. %, preferably 0.005 to 1 wt. %, preferably 0.01 to 0.5 wt. %, preferably 0.05 to 0.15 wt. %, preferably 0.08 to 0.1 wt. %, based on a total weight of the acidic treatment fluid.

In some embodiments, the acidic treatment fluid is substantially free of an intensifier.

Surfactant

The acidic treatment fluid may optionally include one or more surfactants. Surfactants may be employed, for example, when the process equipment to be treated during the acid cleaning/pickling operation is fouled with an oily residue or coating. The surfactant(s), when present, may be included in an amount of 0.001 to 5%, preferably 0.005 to 3%, preferably 0.01 to 1%, preferably 0.1 to 0.5%, preferably 0.2 to 0.4% by weight based on a total volume of the acidic treatment fluid. Cationic, anionic, non-ionic, and/or amphoteric surfactants may be employed herein.

Cationic surfactants may include, but are not limited to a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines;

a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid previously listed (or ester derivative thereof) with a polyamine (e.g., putrescine, cadaverine, ethylene diamine, $N^1,N^1$-dimethylethane-1,2-diamine, $N^1,N^1$-dimethylpropane-1,3-diamine, $N^1,N^1$-diethylethane-1,2-diamine, $N^1,N^1$-diethylpropane-1,3-diamine spermidine, 1,1,1-tris(aminomethyl) ethan, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride;

as well as mixtures thereof.

Anionic surfactants may include, but are not limited to:
sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate;
sulfonates such as dodecyl benzene sulfonate, lower alkyl-benzene sulfonates, alpha olefin sulfonates, lignosulfonates, sulfo-carboxylic compounds;
phosphates of fatty alcohols or polyoxyalkylene ethers of fatty alcohols such as cetyl phosphate salts, dicetyl phosphate salts, ceteth-10-phosphate salts;
carboxylate salts of fatty acids, acylamino acids, lactylates, and/or fatty alcohols/polyoxyalkylene ethers of fatty alcohols such as sodium stearate, sodium behenoyl lactylate, sodium isostearoyl lactylate, sodium caproyl lactylate, sodium laureth-5 carboxylate, sodium laureth-6 carboxylate, sodium laureth-11 carboxylate;
and mixtures thereof.
Non-ionic surfactants may include, but are not limited to:
alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide;
alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);
amine oxides, such as N-cocoamidopropyl dimethyl amine oxide and dimethyl $C_6$-$C_{22}$ alkyl amine oxide (e.g., dimethyl coco amine oxide);
fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;
ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols;
and mixtures thereof.
Amphoteric surfactants may include, but are not limited to:
$C_6$-$C_{22}$ alkyl dialkyl betaines, such as fatty dimethyl betaines (R—N(CH$_3$)$_2$($^+$)—CH$_2$COO$^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);
$C_6$-$C_{22}$ alkyl amido betaines (R—CO—NH—CH$_2$CH$_2$CH$_2$—N(CH$_3$)$_2$($^+$)—CH$_2$COO$^-$ or R—CO—NH—CH$_2$CH$_2$—N(CH$_3$)$_2$($^+$)—CH$_2$COO$^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethyl amino betaine;
$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3^-$ or R—CO—NH—CH$_2$CH$_2$CH$_2$—N(CH$_3$)$_2$($^+$)—CH$_2$CH$_2$CH$_2$SO$_3^-$ or R—CO—NH—CH$_2$CH$_2$—N(CH$_3$)$_2$($^+$)—CH$_2$CH$_2$CH$_2$SO$_3^-$) or a hydroxysulfonic group (R—N(CH$_3$)$_2$($^+$)—CH$_2$CH(OH)—CH$_2$SO$_3^-$ or R—CO—NH—CH$_2$CH$_2$CH$_2$—N(CH$_3$)$_2$($^+$)—CH$_2$CH(OH)—CH$_2$SO$_3^-$ or R—CO—NH—CH$_2$CH$_2$—N(CH$_3$)$_2$($^+$)—CH$_2$CH(OH)—CH$_2$SO$_3$), such as $C_{10}$-$C_{18}$ dimethyl hydroxysultaine and $C_{10}$-$C_{18}$ amido propyl dimethylamino hydroxysultaine;
and mixtures thereof.

In some embodiments, the acidic treatment fluid is substantially free of a surfactant.

Supplemental Antiscalant

In some embodiments, in addition to the acid(s), the acidic treatment fluid may also optionally include one or more supplemental antiscalants, which is a term used herein to define any substance/compound which imparts or is expected to impart a material antiscalant or scale removal effect when included in the acidic treatment fluid, other than the acid (e.g., HCl) present. Such supplemental antiscalants may be classified as chelants and/or dispersants, and include, but are not limited to:

phosphate esters; such as those made from blends of polyphosphoric acid (PPA) and/or $P_2O_5$ with hydroxyamines, e.g., ethanolamine, N-methylethanolamine, N,N-dimethylethanolamine, N-ethylethanolamine, N-propylethanolamine, N-isopropylethanolamine, N,N-diisopropylethanolamine, N-butylethanolamine, diethanolamine, N-methyldiethanolamine, N-ethyldiethanolamine, triethanolamine (TEA), propanolamine (3-Amino-1-propanol), N-methylpropanolamine, N,N-dimethylpropanolamine, dipropanolamine, tripropanolamine, isopropanolamine, N,N-dimethylisopropanolamine, diisopropanolamine, triisopropanolamine, 2-amino-2-methyl-1-propanol, 2-amino-2-ethyl-1,3-propanediol, 4-amino-1-butanol, 2-amino-1-butanol, sec-butanolamine, di-sec-butanolamine, and bishydroxyethylethylene diamine, for example, DANOX SC-100, available from Kao, Inc., which is a 70% by weight active composition of a phosphate ester formed from TEA/PPA; as well as phosphate esters of PPA and/or $P_2O_5$ with hydroxyamines formed by alkoxylation of a primary or secondary amines, for example, alkoxylates of diethylenetriamine (DETA), triethylenetetraamine (TETA), and/or tetraethylenepentaamine (TEPA), for example as described in U.S. Pat. No. 3,477,956A—incorporated herein by reference in its entirety;

organic polymers, preferably polymers based on non-ionic monomers, anionic monomers, or mixtures thereof; including, but not limited to, polymaleates (e.g., homopolymers of maleic acid (HPMA)), polyacrylates (e.g., acrylic acid homopolymer (PAA or HAA), sodium acrylate homopolymer), polymethacrylates, polyacrylamides, polysaccharides including modified polysaccharides (e.g., carboxymethyl inulin), amino acid-based polymers (e.g., polyaspartic acid (PASP) homopolymer and salts thereof), polyethers (e.g., polymers based on polymerization of EO, PO, and/or BO, such as those described in WO2015/195319A1—incorporated herein by reference in its entirety), polymers based on sulfonated monomers such as 2-acrylamido-2-methylpropane sulfonic acid (AMPS), vinylsulfonates (e.g., vinylsulfonic acid and salts thereof), styrene sulfonates, etc.; including modified versions of such polymers as well as blends thereof or copolymers made from two or more types of monomers, for example, maleic acid copolymers, maleic acid terpolymers, sulfonic acid copolymers (SPOCA), sulfonated polyacrylic acid copolymers, modified polyacrylic acids, carboxylate sulfonate copolymers, acrylic acid (AA)/AMPS copolymers, AA/AMPS/non-ionic monomer terpolymers (e.g., AA/AMPS/polyacrylamide terpolymer), carboxylate/sulfonate/maleic acid (MA) terpolymer, AA/MA copolymer (CPMA), sulfonated styrene/MA copolymer, AA/acrylamide copolymer, AMPS/N,N-dimethylacrylamide copolymer, phosphino carboxylic acid (PCA) polymers (e.g., phosphinopolyacrylate), sulfonated phosphino carboxylic acid copolymer (such as BELLASOL S-50 from BWA Water Additives and DREWSPERSE 6980 available from Solenis), partially hydrolyzed polyacrylamide, polyether phosphonic acids (e.g., polyamino polyether methylene phosphonic acid (PAPEMP));

phosphonates; such as aminotris(methylenephosphonic acid) (ATMP), phosphoisobutane tricarboxylic acid (PBTC), 1-hydroxyethylidene diphosphonic acid (HEDP), hexamethylenediamine tetramethylene phosphonic acid (HMDT or HMDTMPA), diethylenetriamine penta(methylenephosphonic acid) (DTPMP), bis(hexamethylene) triamine penta (methylene phosphonic) acid (BHPMP), bis(hexamethylene) triamine pentabis(methylene phosphonic acid) (HMTPMP), pentaethylene hexaamineoctakis (methylene phosphonic acid) (PEHOMP); including aminophosphonates of ethanolamine, ammonia, ethylene diamine, bishydroxyethylene diamine, bisaminoethylether, diethylenetriamine, hexamethylene diamine, hyperhomologues and isomers of hexamethylene diamine, polyamines of ethylene diamine and diethylene tetraamine, diglycolamine and homologues, or similar polyamines or mixtures or combinations thereof;

carboxylate-containing chelating agents (non-polymeric) such as ethylene diamine tetraacetic acid (EDTA), diethylene triatnine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-paramethyl phenyl acetic acid (EDDHMA), ethylene diamine di-ortho-hydroxy-para-carboxy-phenyl acetic acid (EDDCHA), nitrolotriacetic acid (NTA), thioglycolic acid (TGA), hydroxyacetic acid, citric acid, tartaric acid, as well as the sodium, potassium, and/or ammonium salts thereof;

including mixtures thereof.

When present, the concentration of the one or more other supplemental antiscalants in the acidic treatment fluids may be from 0.1 to 10 wt. %, preferably 0.5 to 8 wt. %, preferably 1 to 6 wt. %, preferably 2 to 4 wt. %, preferably 3 wt. %, based on a total weight of the acidic treatment fluid.

Supplemental Corrosion Inhibitor

The acidic treatment fluid may also optionally include a supplemental corrosion inhibitor, which is a term used herein to define any substance/compound which imparts or is expected to impart a material anticorrosive effect when included in the acidic treatment fluid, other than those present in the corrosion inhibitor composition as described above. Therefore, the term supplemental corrosion inhibitor is meant to be distinct and separate from the corrosion inhibitor composition and the compounds present therein. When used, the supplemental corrosion inhibitor may be present in amounts of 0.001 to 5 wt. %, preferably 0.01 to 4 wt. %, preferably 0.1 to 3 wt. %, preferably 0.5 to 2 wt. %, preferably 1 to 1.5 wt. %, based on a total weight of the acidic treatment fluid.

Any corrosion inhibitor known to those of ordinary skill in the art may be used herein as a supplemental corrosion inhibitor. Exemplary supplemental corrosion inhibitors include, but are not limited to, a cinnamaldehyde compound, which are those compounds which contain an optionally substituted aryl group separated from an aldehyde moiety (or protecting group thereof) by one unsaturated carbon-carbon double bond, with said aryl group being unsubstituted (contain only hydrogen as is the case in cinnamaldehyde) or substituted with up to 5 substituents individually selected from the group consisting of an optionally substituted alkyl, an optionally substituted aryl, an optionally substituted alkoxy, an optionally substituted alkanoyloxy, a carboxy, an optionally substituted alkoxycarbonyl, a hydroxy, a halo, an amino group which may be unsubstituted, monosubstituted, or disubstituted, a nitro, a cyano, a sulfate anion, an alkylsulfate, a thiocyano, an optionally substituted alkylthio, an optionally substituted alkylsulfonyl, an optionally substituted arylsulfonyl, or an optionally substituted sulfonamido (e.g., $-SO_2NH_2$), or wherein two adjacent substituents together form a methylene dioxy group, with specific mention being made to cinnamaldehyde, 3,3'-(1,4-phenylene)diacrylaldehyde, p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde, 3,4-dimethoxycinnamaldehyde, 1-ethoxy-2-acetoxycinnamaldehyde, 1-ethoxy-2-hydroxycinnamaldehyde, sinapaldehyde, 2,5-dimethoxy-4-methylenedioxycinnamaldehyde, 2-methoxy-4,5-methylenedioxy cinnamaldehyde, coniferyl aldehyde, 2,3-dimethoxy-4,5-methylenedioxycinnamaldehyde, p-dimethylaminocinnamaldehyde, diethyl aminocinnamaldehyde, p-nitrocinnamaldehyde, o-nitrocinnamaldehyde, 3,4-methylenedioxycinnamaldehyde, sodium p-sulfocinnamaldehyde, p-trimethylammoniumcinnamaldehyde, p-trimethylammoniumcinnamaldehyde o-methyl sulfate, p-thiocyanocinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, and p-methyl-α-pentylcinnamaldehyde;

an alkoxylated fatty amine, which are compounds having a long-chain alkyl group made up of hydrogen and anywhere from 6 to 26 carbon atoms, preferably 8 to 22 carbon atoms, preferably 12 to 20 carbon atoms, more preferably 16 to 18 carbon atoms, bonded to an amine functional group which is alkoxylated, where the fatty portion may be derived/derivable from fatty acids or fatty acid mixtures such as caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, tall oil fatty acid (TOFA), coconut oil fatty acid, tallow fatty acid, and soya fatty acid, and thus may saturated or may contain sites of unsaturation (e.g., mono-, di-, tri-, oligo-, or poly-unsaturated), with specific mention being made to a coconut amine alkoxylate, a stearyl amine alkoxylate, a palmitoleylamine alkoxylate, a oleylamine alkoxylate, a tallow amine alkoxylate, a tall oil amine alkoxylate, a laurylamine alkoxylate, a myristylamine alkoxylate, a cetylamine alkoxylate, a stearylamine alkoxylate, a linoleyl amine alkoxylate, a soya amine alkoxylate, as well as alkoxylated ethylene diamine variants thereof, alkoxylated trimethylene diamine variants thereof, alkoxylated diethylene triamine variants thereof, and alkoxylated dipropylene triamine variants thereof;

an imidazoline compound, which are those compounds which can be generally formed from a reaction between (i) a fatty acid or an ester derivative thereof, for example a $C_1$ to $C_{12}$ alkyl ester (e.g., methyl, ethyl, etc.) of a fatty acid or a glycerol ester of a fatty acid, and (ii) a polyamine which contains at least one ethylene diamine group (in various molar ratios between (i) and (ii)), such as those imidazoline compounds prepared from reaction between (i) tall oil fatty acid (TOFA), coconut oil fatty acid, tallow fatty acid, soya fatty acid, and/or oleic acid and (ii) any polyamine containing two, three, four, or more nitrogen groups, which may be primary, secondary, or tertiary amines, so long as at least one ethylene diamine group is present that is capable of reacting with a carboxylic acid group to form an imidazoline structure (e.g., ethylene diamine, β-hydroxyethyl ethylene diamine, 1,2-diaminopropane, 1,2-diaminocyclohexane, 2,3-diaminobutane, 2,3-diaminobutan-1-ol propane-1,2,3-triamine, tris(2-aminoethyl)amine, tetraethylenepentamine (TEPA), diethylenetriamine (DETA), triethylentetramine (TETA), aminoethylethanolamine (AEEA), pentaethylene hexamine (PEHA), and hexaethylene heptamine (HEHA)), with specific mention being made to 1:1 (molar ratio) TOFA/DETA imidazoline, 2:1 TOFA/DETA imidazoline, 1:1 TOFA/TETA imidazoline, 2:1 TOFA/TETA imidazoline, 2:1 TOFA/TETA bis-imidazoline, 1:1 TOFA/TEPA imidazoline, 2:1 TOFA/TEPA imidazoline, 2:1 TOFA/TEPA bis-imidazoline, 3:1 TOFA/TEPA bis-imidazoline, 1:1 TOFA/AEEA imidazoline, 2:1 TOFA/AEEA imidazoline, 1:1 TOFA/polyamine imidazoline, 2:1 TOFA/polyamine imidazoline, 2:1 TOFA/polyamine bis-imidazoline, 3:1 TOFA/TEPA polyamine bis-imidazoline, 1:1 Soya/DETA imidazoline, 2:1 Soya/DETA imidazoline, 1:1 Soya/TETA imidazoline, 2:1 Soya/TETA imidazoline, 2:1 Soya/TETA bis-imidazoline, 1:1 Soya/TEPA imidazoline, 2:1 Soya/TEPA imidazoline, 2:1 Soya/TEPA bis-imidazoline, 3:1 TOFA/TEPA bis-imidazoline, 1:1 Soya/AEEA imidazoline, 2:1 Soya/AEEA imidazoline, 1:1 Soya/polyamine imidazoline, 2:1 Soya/polyamine imidazoline, 2:1 Soya/polyamine bis-imidazoline, 1:1 Tallow/DETA imidazoline, 2:1 Tallow/DETA imidazoline, 1:1 Tallow/TETA imidazoline, 2:1 Tallow/TETA imidazoline, 2:1 Tallow/TETA bis-imidazoline, 1:1 Tallow/TEPA imidazoline, 2:1 Tallow/TEPA imidazoline, 2:1 Tallow/TEPA bis-imidazoline, 3:1 Tallow/TEPA bis-imidazoline, 1:1 Tallow/AFEA imidazoline, 2:1 Tallow/AFEA imidazoline, 1:1 Tallow/polyamine imidazoline, 2:1 Tallow/polyamine imidazoline, 2:1 Tallow/polyamine bis-imidazoline, 3:1 Tallow/TEPA polyamine bis-imidazoline;

inorganic metal or organometallic compounds such as chromates, arsenates, zinc salts, iodates, metavanadates, and molybdates;

phosphorous-containing compounds such as (poly)phosphates and phosphonates;

acetylenic alcohols such as propargylic (propargyl) alcohol, pent-4-yn-1-ol, hexynol, ethyl octynol, octynol, 3-phenyl-2-propyn-1-ol;

aldehydes (other than cinnamaldehydes above) such as crotonaldehyde and aromatic aldehydes such as furfural and p-anisaldehyde;

phenones including alkenyl phenone such as β-hydroxypropiophenone, phenyl vinyl ketone, and β-ethylphenylketocyclohexyl amino hydrochloride (including those phenones and blends described in US20170233872A1, incorporated herein by reference in its entirety);

nitrogen-containing heterocycles (other than the imidazoline and the pyrazine corrosion inhibitors described above) such as piperazine and hexamethylene tetramine;

quaternized heteroarenes (e.g., 1-(benzyl)quinolinium chloride);

condensation products of carbonyls and amines (e.g., Schiff bases);

sulfur containing compounds such as thiocarbamides, mercapto amino acids, esters, or peptides, thioglycols, and thioureas;

as well as mixtures thereof.

In preferred embodiments, the acidic treatment fluid is substantially free of supplemental corrosion inhibitors.

Additives

The acidic treatment fluids may optionally further include one or more additives to modify the properties or functions of the acidic treatment fluid, as needed. Typically, when present, the additive(s) may be incorporated in an amount of less than 10 wt. %, preferably less than 8 wt. %, preferably less than 6 wt. %, preferably less than 4 wt. %, preferably less than 2 wt. %, preferably less than 1 wt. %, preferably less than 0.5 wt. %, preferably less than 0.1 wt. %, based on a total weight of the acidic treatment fluid.

Exemplary additive(s) may include, but are not limited to, stabilizing agents e.g., polypropylene glycol, polyethylene glycol, polysiloxane polyalkyl polyether copolymers, acrylic copolymers, carboxyvinyl polymers, polyvinylpyrollidones, polyacrylates;

dispersing agents e.g., polymeric or co-polymeric compounds of polyacrylic acid, polyacrylic acid/maleic acid copolymers, styrene/maleic anhydride copolymers, polymethacrylic acid, and polyaspartic acid;

defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts;

as well as mixtures thereof.

In some embodiments, the acidic treatment fluid is substantially free of an additive.

The methods herein inhibit corrosion of metal surfaces during acid cleaning or acid pickling, preferably during acid cleaning/pickling of a desalination system. The desalination system may be used for primary desalination (usually thermal driven process) and/or a secondary desalination process (usually a pressure driven process involving the use of membranes). The desalination system may be a multi-stage flash (MSF) desalination plant, a multiple effect distillation (MED) plant, a vapor-compression (VC) distillation plant, a geothermal desalination plant, a solar desalination system (e.g., multiple—effect humidification (MEH) system), or any other thermally driven desalination system known to those of ordinary skill in the art.

Any metal surface that is susceptible to the formation of scale can be treated by the methods disclosed herein, including, but not limited to, separation vessels, pipelines, valves, spools, fittings, storage tanks, heat exchangers (e.g., coils of heat exchangers), pump parts, casings, liners, screens, and utility steam condensers, with specific mention being made to the surfaces of heat exchangers (e.g., heat exchanger tubes/coils) and utility steam condensers of desalination plants (e.g., multi-stage flash desalination plant). In preferred embodiments, the acidic treatment fluid is used to remove scale from and to simultaneously prevent corrosion of any metal parts present in/on the part(s) being treated.

Any metal surface that may come into contact with the acidic treatment fluid may be protected by the corrosion inhibitor composition of the present disclosure. Examples of such metals include, but is not limited to, titanium and titanium alloys, carbon steels (e.g., mild steels, high-tensile steels, higher-carbon steels); high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof.

In preferred embodiments, the metal is titanium or an alloy thereof. Titanium and titanium alloys are widely used in industry as a construction material for linings, vessels, piping and the like, and in particular, for the fabrication of heat exchanger coils and utility steam condensers such as those commonly found in desalination plants. In some embodiments, the metal is unalloyed titanium. In some embodiments, the metal is a titanium alloy. The titanium alloys whose corrosion can be inhibited by the methods of the present disclosure are those alloys which contain titanium as the predominant metal, preferably alloys containing at least 50 wt. %, preferably at least 60 wt. %, preferably at least 70 wt. %, preferably at least 80 wt. %, preferably at least 90 wt. %, preferably at least 93 wt. %, preferably at least 95 wt. %, preferably at least 97 wt. %, preferably at least 99 wt. % Ti, and which can also include up to 30 wt. %, preferably up to 20 wt. %, preferably up to 10 wt. %, preferably up to 7 wt. %, preferably up to 5 wt. %, preferably up to 3 wt. %, preferably up to 1 wt. %, of such other metals as Al, V, Mo, Pd, Pt, Ni, Cr, Fe, Sn, Mn, Zr, Cb, Ta and the like. The titanium alloy may be an alpha alloy (e.g., Ti—5Al—2Sn-ELI, Ti—8Al—1Mo—1V), a near-alpha alloy (e.g., Ti—6Al—2Sn—4Zr—2Mo, Ti—5Al—5Sn—2Zr—2Mo, IMI 685, Ti 1100), an alpha and beta alloy (e.g., Ti—6Al—4V, Ti—6Al—4V-ELI, Ti—6Al—6V—2Sn, Ti—6Al—7Nb), or a beta and near beta alloy (e.g., Ti—10V—2Fe—3Al, Ti—29Nb—13Ta—4.6Zr,[3]Ti—13V—11Cr—3Al, Ti—8Mo—8V—2Fe—3Al, Beta C, Ti-15-3). Any grade of titanium/titanium alloy may be treated by the disclosed methods, including, but not limited to, Grade 1, Grade 2, Grade 2H, Grade 3, Grade 5, Grade 6, Grade 7, Grade 7H, Grade 9, Grade 11, Grades 13-15, Grade 16, Grade 16H, Grade 18, Grade 26H, among many others, preferably the metal is Grade 2 titanium, which is unalloyed titanium having standard oxygen content.

In some embodiments, the acidic treatment fluid is preformed by combining the acid (aq.), the corrosion inhibitor composition, and any optional components, followed by introducing the pre-formed acidic treatment fluid into an appropriate location in need of descaling, for example, inside the heat exchanger tubing of a desalination plant. In some embodiments, the acid (aq.) and the corrosion inhibitor composition (and any optional components) are introduced as separate streams, combining at the location to be descaled to form the acidic treatment fluid for acid cleaning/pickling. The corrosion inhibitor composition may be injected before, after, or simultaneously with the acid (aq.) for use in the acid cleaning/pickling process.

The acidic treatment fluid may be introduced for acid cleaning/pickling treatment using any technique known to those of ordinary skill in the art. For example, the acidic treatment fluid may be injected through suitable injection lines to areas where acid cleaning/pickling is desired, cycled through the plant being treated as an influent stream, or used as a soak. Treatment may be performed manually or it may be automatic, for example, by using chemical injection pumps. In some embodiments, the acidic treatment fluid may be stored in a chemical storage tank and a chemical injection pump associated therewith may be used to introduce the acidic treatment fluid into the desired location of the operation. In any of the above applications, the acidic treatment fluid may be introduced continuously and/or in batches. The treatment may be carried out by using inline static mixers, inline mixers with velocity gradient control, inline mechanical mixers with variable speed impellers, inline jet mixers, motorized mixers, batch equipment, and appropriate chemical injection pumps and/or metering systems, just to name a few. The treatment can be automatically or manually controlled to add any amount of the acidic treatment fluid needed for adequate descaling/cleaning.

In some embodiments, the metal is treated with the acidic treatment fluid under static conditions, that is, the metal (having the scale deposit) may be in contact with a substantially stationary body of the scale inhibitor composition (e.g., soaking methods). In alternative embodiments, the metal is treated with the acidic treatment fluid under hydrodynamic conditions, whereby the metal may be brought into contact with the acidic treatment fluid that is in a flowing state, for example, where a stream of the acidic treatment fluid is jetted/impinged onto the surface having the scale deposit, or where a stream of the acidic treatment fluid is flowed or passed over the surface having the scale deposit. For example, when the surface having the scale deposit is an inside surface of a heat exchanger coil, the acidic treatment fluid may be flowed or passed through the heat exchanger coil in a direction substantially parallel to the longitudinal axis of the coil. Typically, the acidic treatment fluid may be flowed or passed over the surface having the scale deposit at a flow rate of 0.1 to 10 m/s, preferably 0.5 to 5 m/s, preferably 1 to 3 m/s, preferably 1.5 to 2 m/s, although flow rates above or below these ranges may also be used when appropriate.

The metal may be treated with the acidic treatment fluid at a variety of temperatures to effect scale removal, and, even at elevated temperatures, the corrosion inhibitor composition present in the acidic treatment fluid remains effective at preventing corrosion from occurring to that metal surface. For example, the metal may be treated with the acidic treatment fluid at a temperature of 20 to 100° C., preferably 30 to 80° C., preferably 40 to 70° C., preferably 50 to 60° C.

Corrosion rate is the speed at which metals undergo deterioration. Corrosion rate may be measured according to the American Society for Testing and Materials (ASTM) standard weight loss (immersion) test ASTM G-1 and G-4 (See ASTM-G 01-03, ASTM Book of Standards, West Conshohocken: ASTM, 2003, vol. 3.02, and ASTM-G 01-90, Standard practice for preparing, cleaning, and evaluation corrosion test specimens, ASTM Book of Standards (Reapproved 1999), each incorporated herein by reference in its entirety, and described in the Examples), and may be computed using millimeters per year (mm/y). In some embodiments, the method provides a corrosion rate of less than 0.1 mm/y, preferably less than 0.05 mm/y, preferably less than 0.01 mm/y, preferably less than 0.005 mm/y, preferably less than 0.001 mm/y, preferably less than 0.0008 mm/y, preferably less than 0.0005 mm/y, when the metal is contacted with the acidic treatment fluids for a time period of up to 200 hours, preferably up to 190 hours, preferably up to 180 hours, preferably up to 170 hours, preferably up to 168 hours, at a temperature of 40 to 70° C.

Corrosion rate may also be measured using linear polarization resistance (LPR), as described in the Examples, and may be computed using mils penetration per year (mpy). In some embodiments, the method provides a corrosion rate of less than 0.6 mpy, preferably less than 0.59 mpy, preferably less than 0.58 mpy, preferably less than 0.5 mpy, preferably less than 0.3 mpy, preferably less than 0.2 mpy, preferably less than 0.1 mpy, preferably less than 0.05 mpy, preferably less than 0.01 mpy, preferably less than 0.005 mpy, preferably less than 0.001 mpy, preferably less than 0.0005 mpy, preferably less than 0.00045 mpy, when the metal is contacted with the acidic treatment fluids for a time period of up to 36 hours, preferably up to 30 hours, preferably up to 24 hours, preferably up to 20 hours, preferably up to 18 hours, preferably up to 12 hours, at a temperature of 40 to 50° C.

The examples below are intended to further illustrate protocols for preparing and testing the acidic treatment fluids and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Experimental

Preparing the Pineapple Leaves Extract

A cold extraction method was used to prepare the pineapple leaves extract. Sun dried pineapple leaves were ground to powder form using an electric blender. 5 g of the powder was soaked in 200 ml of ethanol for 48 hrs with constant stirring at 800 rpm using a magnetic stirrer. The mixture was filtered and the filtrate was concentrated to a semi-solid sample using a rotary evaporator. 0.5 g of the semi-solid ethanolic extract was used in the preparation of SOLOREN B as described below.

Preparing the Corrosion Inhibitor Composition (or "Formulation" or "SOLOREN B")

Firstly, an isopropanol/distilled water mixture (50:50) was prepared. This serves as the solvent for the formulation. Secondly, 1 g each of carboxymethyl cellulose (CMC), gum arabic (GA), and pectin (PEC) was accurately weighed and dissolved in 1000 cm$^3$ (1 L) of the solvent. It should be mentioned that other natural polymers like sodium alginate, chitosan, dextran, hydroxyl ethyl cellulose, soluble starch etc. (FIG. 1) could be used in place of CMC, GA, and PEC. Thirdly, the natural polymer-solvent solution was used to prepare 1 mM of $AgNO_3$ (i.e., 0.02 g $AgNO_3$ was dissolved in the solution). The mixture was stirred for 20 minutes and thereafter, 0.5 g of ethanolic extract of pineapple leaves (obtained as described above) was added and the resultant yellow color mixture was allowed to stand at room temperature for 72 h. Let it also be mentioned, that other plant extracts like the date palm leaf extract can be used in place of the pineapple leaves extract. After 72 h, a dark-yellow viscous solution (FIG. 2), herein referred to as "SOLOREN B", was obtained which signaled the complete conversion of silver ions to silver nanoparticles. See M. M. Solomon, H. Gerengi, S. A. Umoren, Carboxymethyl cellulose/silver nanoparticles composite: Synthesis, characterization and application as a benign corrosion inhibitor for St37 steel in 15% $H_2SO_4$ medium, ACS Appl. Mater. Interfaces 9 (2017) 6376-6389; M. M. Solomon, H. Gerengi, T. Kaya, S. A. Umoren, Performance evaluation of chitosan/silver nanoparticles composite on St37 steel corrosion in 15% HCl solution, ACS Sustainable Chemistry and Engineering 5 (2017) 809-820; and M. M. Solomon, S. A. Umoren, In-situ preparation, characterisation, and anticorrosion property of polypropylene glycol/silver nanoparticles composite for mild steel corrosion in acid solution. Journal of Colloid and Interface Science 462 (2016) 29-41, each incorporated herein by reference in their entirety.

Materials and Instrumentation

TITANIUM GRADE 2 COMPOSITION (wt. %): C (0.10), Fe (0.30), H (0.015), N (0.03), O (0.25), Ti (99.20).

ELECTROCHEMICAL WORKSTATION: Gamry Instrument Potentiostat/Galvanostat/ZRA (Reference 600) with a Gamry framework system based on ESA410.

Experimental Conditions

CONCENTRATIONS: 0.3% vol./vol, 0.4% vol./vol, and 1% vol./vol. (% volume formulation in corrosive medium)
TIME: 6 h, 24 h, 72 h, 168 h
TEMPERATURE: 40 and 70° C.
CORROSIVE MEDIUM: Acidified seawater (2% HCl solution prepared using seawater)
CORROSIVE MEDIUM CONDITION: Static and hydrodynamic
ROTATION SPEED EMPLOYED FOR HYDRODYNAMIC MEASUREMENTS: 600 rpm (i.e., 1.5 m/s flow rate)
Standard Techniques Adopted
WEIGHT LOSS
LINEAR POLARIZATION RESISTANCE Weight Loss Test The titanium samples used for the weight loss measurements were cut into 2.792 cm×3.145 cm×0.200 cm dimension (Total surface area=19.936 cm$^2$). The surface pretreatment of the specimens was done in accordance with the ASTM G-1 & G-4 recommended standard. See ASTM-G 01-03, ASTM Book of Standards, West Conshohocken: ASTM, 2003, vol. 3.02; ASTM-G 01-90, Standard practice for preparing, cleaning, and evaluation corrosion test specimens, ASTM Book of Standards (Reapproved 1999), each incorporated herein by reference in their entirety. The specimens were wet abraded using silicon carbide papers (grade #400 to #800) to mirror finishing. Thereafter, they were rinsed in running water and acetone to get rid of possible residue generated by the abrasion process, dried using a specimen dryer at temperature of 40° C., and then preserved in a moisture-free desiccator prior to use. Weight loss experiments were carried out in a glass reaction vessels containing 100 mL of test solution maintained at 40 and 70° C. respectively in a thermostated water bath for different immersion durations (6 h, 24 h, 72 h, and 168 h). The tests were performed under total immersion in naturally aerated and static conditions in the absence and presence of inhibitor.

Electrochemical Test

The linear polarization resistance (LPR) technique ($R_p/E_c$ trend) was adopted for the investigation of the corrosion behavior of the titanium grade 2 in acidified seawater without and with commercial inhibitors NEVAMINE CP-20 ("Com. A") and PROTODIN ("Com. B") and with inventive corrosion inhibitor SOLOREN B under static and hydrodynamic conditions. The experiments were performed using a conventional three electrodes Gamry Instrument Potentiostat/Galvanostat/ZRA (Reference 600) inbuilt with a Gamry framework system based on ESA410. The Gamry application software DC105 was used for the LPR measurements. The prepared titanium specimen was the working electrode and has an exposed surface area in corrosive environment of 1 cm$^2$. The counter and reference electrodes were a graphite rod and silver/silver chloride electrode (Ag/AgCl), respectively. The linear polarization resistance experiments were conducted within the potential range±0.02 V with respect to the open circuit potential, and the current response was measured at a scan rate of 0.2 mV/s. The hydrodynamic experiments were simulated using magnetic stirrer of radius 0.023 meters. The rotation speed adopted was 600 rpm which corresponds to a flow rate of 1.5 m/s.

Results and Discussion

Figure 2:
FIG. 2 is a picture of the corrosion inhibitor composition, also referred to as "formulation" or "SOLOREN B"
Figure 3:
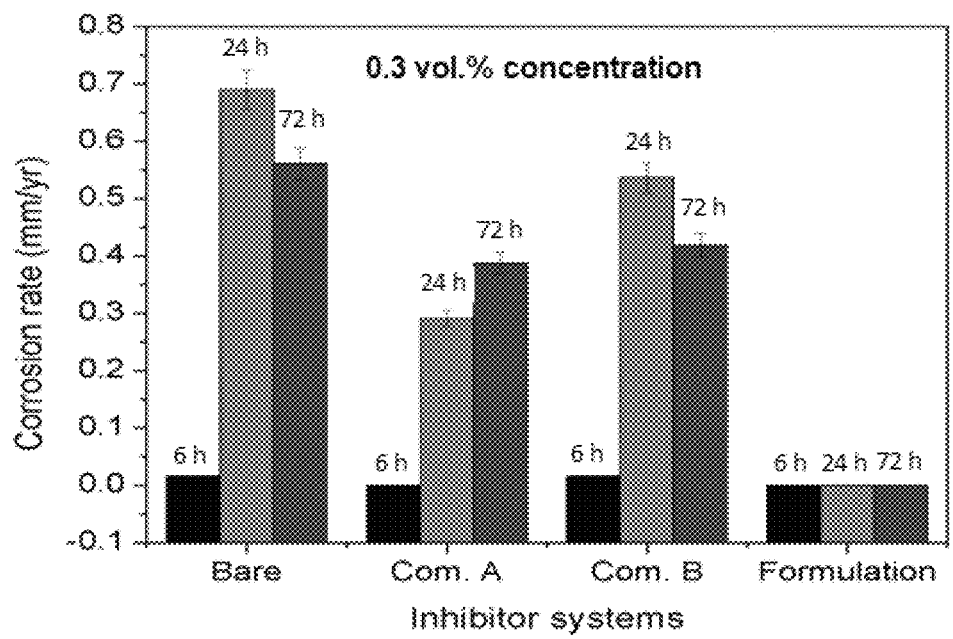
FIG. 3 is a bar graph showing the corrosion rate of Ti-Grade 2 in acidified seawater without and with 0.3 vol. % additives at different immersion durations at 40° C.
Figure 4:
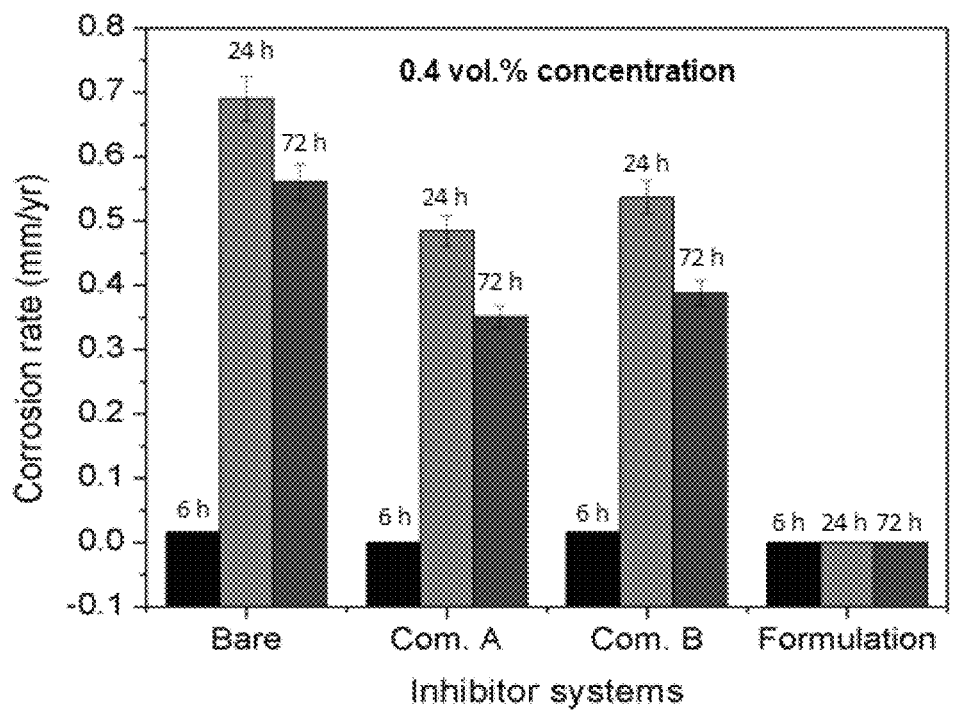
FIG. 4 is a bar graph showing the corrosion rate of Ti-Grade 2 in acidified seawater without and with 0.4 vol. % additives at different immersion durations at 40° C.

The corrosion inhibitor composition described herein is environmentally friendly, biodegradable, cheap, readily available, easily prepared, and provides outstanding corrosion protection performance. The inhibitor, SOLOREN B can be a replacement for the highly expensive and toxic corrosion inhibitors currently used in heat exchanger plants and cooling water systems. FIG. 1 shows structures of the natural polymers used or that can be used as actives in the formulation of SOLOREN B. The appearance of the formulation is shown in FIG. 2, though it should be mentioned that SOLOREN B is colorless upon addition to the corrosive solution. FIG. 3 shows the corrosion rate (mm/yr) recorded for titanium grade 2 in the absence and presence of 0.3% vol./vol of commercial inhibitors (Com. A and Com. B) or SOLOREN B at 40° C. and at different immersion times. A similar plot, but in the presence of 0.4% vol./vol of commercial inhibitors or SOLOREN B is given in FIG. 4. It is observed from FIGS. 3 and 4 that at 6 h the titanium specimens exhibited good corrosion resistance in the acid solution with and without inhibitor. The corrosion rate of the metal in the blank solution is 0.0161 mm/yr and 0.0000 mm/yr in the inhibited systems. In either case, the corrosion rate is within the acceptable corrosion rate of <0.03 mm/yr (<1 mpy) for titanium. See M. G. Fontana, Corrosion Engineering, 3$^{rd}$ eds., McGraw-Hill, 1978, p. 172; and H. Uhlig, R. Revie, Corrosion and Control, 3$^{rd}$ ed., Wiley, 1985, p. 13, each incorporated herein by reference in their entirety. As earlier mentioned, titanium exhibits good corrosion resistance in acid medium. See I. N. Andijani, S. Ahmad, A. U. Malik. Corrosion behavior of titanium metal in presence of inhibited sulfuric acid at 50° C. Presented at the International Desalination Association World Congress on Desalination and Water Reuse, "The Value of Water in the 21st Century, San Diego, USA. 29 Aug. 1999; and I. N. Andijani, S. Ahmad, A. U. Malik, Corrosion behavior of titanium metal in presence of inhibited sulfuric acid at 50° C., Desalination 129 (2000) 45-51, each incorporated herein by reference in their entirety. However, as the immersion time was increased to 24 h, the metal experienced substantial weight loss in the aggressive medium and the calculated corrosion rate is 0.6896 mm/yr. Further inspection of the figures reveal that the corrosion rate slightly decreased as the immersion time increased to 72 h. This may infer that the corrosion product deposited on the metal surface offers some level of protection to the surface. By comparing the corrosion rate of the bare sample at 24 h and 72 h to those of Com. A and B, it could be seen that the commercial inhibitors decreased the corrosion rate to an extent. For instance, 0.3 vol. % Com. A and B decreased the corrosion rate to 0.2904±0.0111 mm/yr and 0.5364±0.0008 mm/yr, respectively, after 24 h of exposure. However, these values are higher than the acceptable corrosion rate of 0.03 mm/yr for titanium meaning that the two commercial inhibitors fails after 6 h of immersion. Clearly, it can be seen in the figures that SOLOREN B was able to keep the corrosion rate of the metal within the acceptable limit up to 72 h. Thus, SOLOREN B performs far better than the two commercial inhibitors as a corrosion inhibitor.

Figure 5:
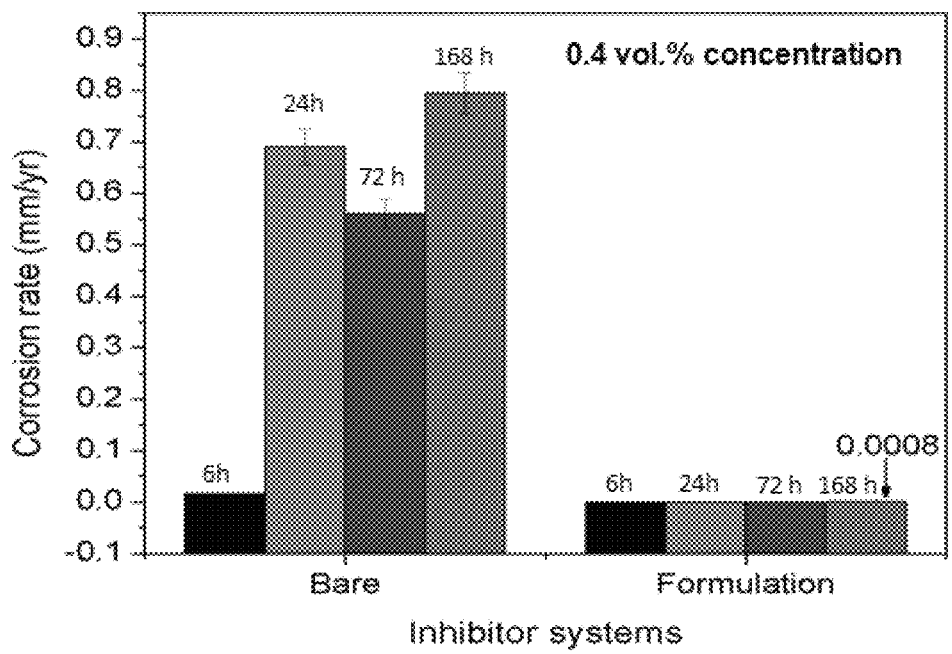
FIG. 5 is a bar chart showing the effectiveness of the formulation up to 168 h at a concentration of 0.4 vol. %.
Figure 6:
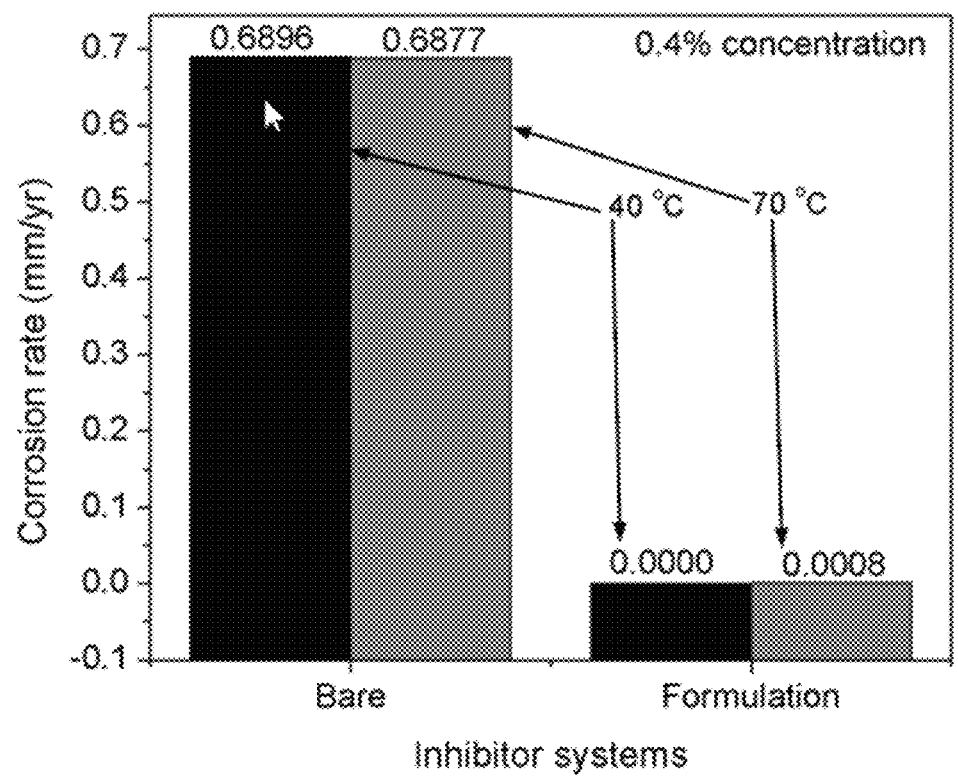
FIG. 6 is a bar graph showing the effectiveness of the formulation at 40 and 70° C. at a concentration of 0.4 vol. %.

Having established that SOLOREN B performed better than the two commercial inhibitors, experiments were conducted to underscore the performance of SOLOREN B at longer immersion time and higher temperature. FIG. 5 shows the variation of corrosion rate of titanium grade 2 in acidified seawater without and with 0.4% vol./vol. SOLOREN B with time. As can be seen in the figure, the metal corroded at an alarming rate of 0.7941±0.0004 mm/yr in the unprotected acid solution when the immersion time was extended to 168 h. The corrosion rate was significantly decreased when 0.4% vol./vol. SOLOREN B was added (i.e, 0.0008±0.0001 mm/yr was recorded at 168 h). This clearly shows the high effectiveness of SOLOREN B as a corrosion inhibitor for titanium. Again, FIG. 6 reveals that SOLOREN B is capable of inhibiting titanium corrosion at temperature up to 70° C. At 70° C., the presence of 0.4% vol./vol. SOLOREN B caused a decrease in the corrosion rate of the metal sample from 0.6877±0.0010 mm/yr to 0.0008±0.0002 mm/yr after 24 h of immersion.

Figure 7:
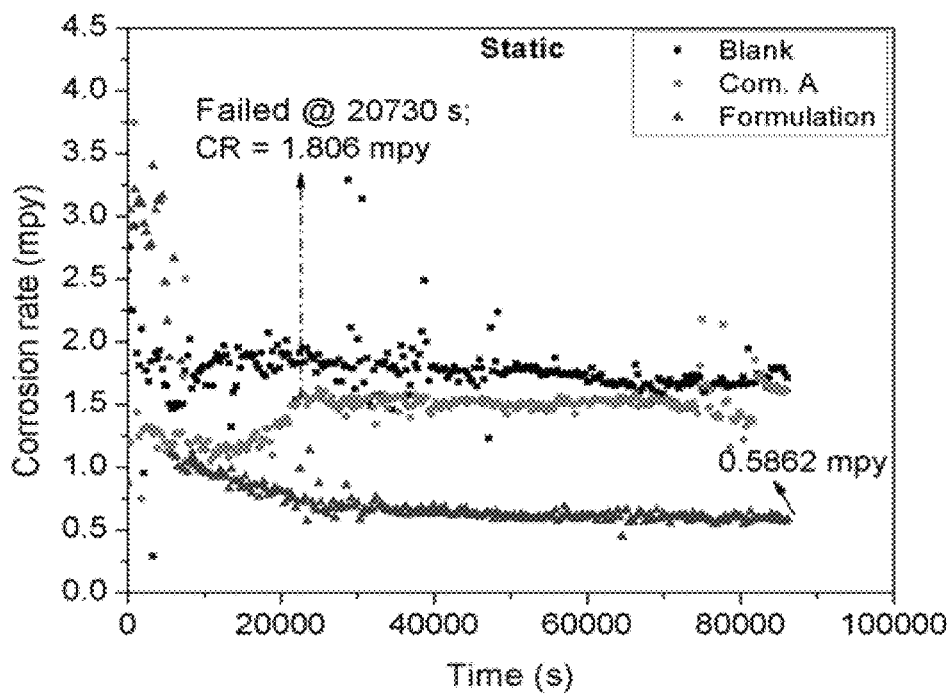
FIG. 7 illustrates the linear polarization resistance results showing the variation of the corrosion rate of Ti-Grade 2 in acidified seawater without and with additives at 40° C. at a concentration of 0.4 vol. %.

To verify the weight loss results, the linear polarization resistance technique was used to directly measure the corrosion rate of the titanium specimen as a function of time. The experiments were performed at 40° C. and for 24 h. The results obtained are presented in FIG. 7. The electrochemical results are in perfect agreement with the weight loss results. The commercial inhibitor (Com. A) actually protected the metal sample by decreasing the corrosion rate from about 3.6 mpy to 0.6 mpy at the early stage of the measurement. This was almost sustained up to about 18,000 s but thereafter, the efficacy of the commercial inhibitor began to weaken and failed completely at about 20,730 s. SOLOREN B on the other hand, decreased the corrosion rate from 3.5 mpy to 0.5 mpy and kept the corrosion rate within the acceptable range throughout the time of measurement. This again shows the superiority of SOLOREN B over the commercial inhibitor (Com. A).

Figure 8:
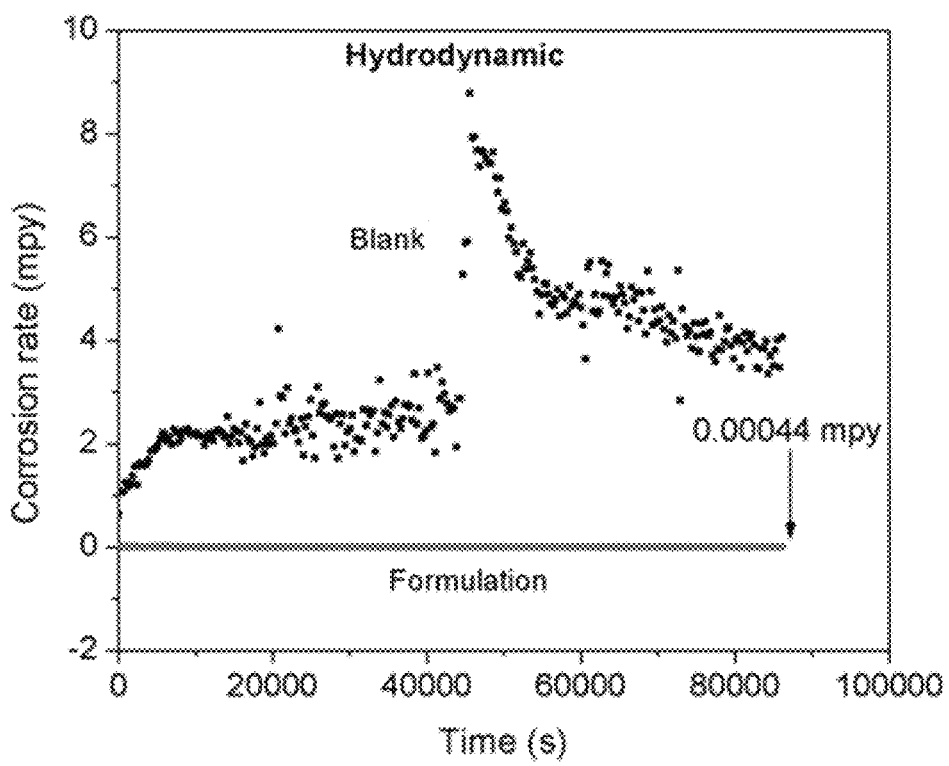
FIG. 8 illustrates the linear polarization resistance results showing the variation of the corrosion rate of Ti-Grade 2 in acidified seawater without and containing 1% vol./vol. SOLOREN B at 40° C. under hydrodynamic conditions.

SOLOREN B also performs outstandingly well under hydrodynamic condition. As can be seen in FIG. 8, without the formulation, the metal specimen corroded at an alarming rate with a corrosion rate of 8.789 mpy and 4.058 mpy recorded at 45630 s and 86130 s, respectively. In the presence of 1 vol. % SOLOREN B, the corrosion rate was kept at zero throughout the duration of measurement. In fact, at 24 h, a corrosion rate of 0.00044 mpy was recorded as against 4.058 mpy for the blank.

Therefore, some of the advantages of the corrosion inhibitor compositions include: 1) it is made from cheap raw material (the natural polymers are cost effective compared to the costly synthetic additives currently in use), 2) SOLOREN B is 100% green unlike most synthetic products used commercially, 3) the natural polymers as well as the plant extract used as the reducing agent are readily available, 4) SOLOREN B does not require a complex procedure for formulation, 5) the natural polymers as well as the plant extract are biodegradable—the silver nanoparticles are present only in a minute amount and no known adverse effect on humans or the environment has been reported 6) SOLOREN B is highly effective at inhibiting corrosion due to the synergistic effect between the formulation components, and 7) reduced costs for industries like chemical process industry, energy and geothermal, pulp and paper, desalination industry, refineries, and utility industries in which titanium finds widespread usage.

The invention claimed is:

1. A method of inhibiting corrosion of metal during acid cleaning/pickling, the method comprising:
    treating the metal with an acidic treatment fluid comprising 1 to 5 wt. % of an acid, based on a total weight of the acidic treatment fluid, and 0.1 to 5 vol. % of a corrosion inhibitor composition based on a total volume of the acidic treatment fluid
    wherein the corrosion inhibitor composition comprises:
        a base fluid comprising water and an alcohol;
        a mixture of at least three polysaccharides selected from the group consisting of carboxymethyl cellulose, gum arabic, pectin, a salt of alginic acid, chitosan, dextran, hydroxyethyl cellulose, and soluble starch, with each polysaccharide that is present in the mixture being present in an amount of 0.05 to 0.5 wt. %, based on a total weight of the corrosion inhibitor composition;
        silver nanoparticles; and
        a pineapple leaves extract,
        wherein the corrosion inhibitor composition provides a hydrodynamic corrosion rate of less than 0.0008 mpy on Grade-2 Ti when applied at a concentration of 0.3-1 wt % after 168 hours of exposure to a 2% HCl solution in seawater at a temperature of 40-70° C.

2. The method of claim 1, wherein the corrosion inhibitor composition is present in the acidic treatment fluid in an amount of 0.3 to 1 vol. %, based on a total volume of the acidic treatment fluid.

3. The method of claim 1, wherein the acidic treatment fluid is acidified seawater, and the acid is hydrochloric acid.

4. The method of claim 1, wherein the metal is titanium.

5. The method of claim 1, wherein the metal is treated with the acidic treatment fluid at a temperature of 40 to 70° C.

6. The method of claim 1, wherein the metal is treated with the acidic treatment fluid under static conditions.

7. The method of claim 1, wherein the metal is treated with the acidic treatment fluid under hydrodynamic conditions, whereby the metal is contacted with the acidic treatment fluid at a flow rate of 0.5 to 5 m/s.

8. The method of claim 1, wherein the metal is present in a heat exchanger tube in a desalination plant, and the treating is performed to remove a buildup of scale on the heat exchanger tube.

\* \* \* \* \*